US010355788B2

(12) United States Patent
    Cirit

(10) Patent No.: US 10,355,788 B2
(45) Date of Patent: Jul. 16, 2019

(54) METHOD AND SYSTEM FOR ULTRASONIC PROXIMITY SERVICE

(71) Applicant: Uber Technologies, Inc., San Francisco, CA (US)

(72) Inventor: Fahrettin Olcay Cirit, San Francisco, CA (US)

(73) Assignee: Uber Technologies, Inc., San Francisco, CA (US)

( * ) Notice: Subject to any disclaimer, the term of this patent is extended or adjusted under 35 U.S.C. 154(b) by 163 days.

(21) Appl. No.: 15/400,173

(22) Filed: Jan. 6, 2017

(65) Prior Publication Data

US 2018/0198535 A1    Jul. 12, 2018

(51) Int. Cl.
| | |
|---|---|
| H04B 11/00 | (2006.01) |
| H04M 1/725 | (2006.01) |
| H04W 4/00 | (2018.01) |
| G01S 5/22 | (2006.01) |
| H04L 29/06 | (2006.01) |
| H04W 4/80 | (2018.01) |
| H04W 12/12 | (2009.01) |
| G01S 5/18 | (2006.01) |

(52) U.S. Cl.
    CPC .......... *H04B 11/00* (2013.01); *H04L 63/0853* (2013.01); *H04M 1/72569* (2013.01); *H04W 4/80* (2018.02); *H04W 12/12* (2013.01); *G01S 5/18* (2013.01)

(58) Field of Classification Search
    CPC ...... H04B 11/00; H04W 4/80; H04L 63/0853; H04M 1/72569; G01S 5/22; G01S 5/18
    See application file for complete search history.

(56) References Cited

U.S. PATENT DOCUMENTS

| | | |
|---|---|---|
| 5,168,451 A | 12/1992 | Bolger |
| 5,212,645 A | 5/1993 | Wildes et al. |
| 5,604,676 A | 2/1997 | Penzias |
| 5,945,919 A | 8/1999 | Trask |
| 6,028,537 A | 2/2000 | Suman |
| 6,212,393 B1 | 4/2001 | Suarez |
| 6,356,838 B1 | 3/2002 | Paul |
| 6,618,593 B1 | 9/2003 | Drutman |
| 6,756,913 B1 | 6/2004 | Ayed |
| 6,874,037 B1 | 3/2005 | Abram |
| 6,925,381 B2 | 8/2005 | Adamcyzk |

(Continued)

FOREIGN PATENT DOCUMENTS

| | | |
|---|---|---|
| CA | 2889853 | 5/2014 |
| CN | 201918124 | 8/2011 |

(Continued)

OTHER PUBLICATIONS

ISR and Written Opinion issued in PCT/US2017/066859 dated Mar. 15, 2018.

(Continued)

*Primary Examiner* — Daniel Pihulic
(74) *Attorney, Agent, or Firm* — Mahamedi IP Law LLP

(57) ABSTRACT

A network service can detect an ultrasonic signal by an ultrasonic receptive component of a first device. The ultrasonic signal can be based on an ultrasonic output signal transmitted from an audio output component. In response to the detected ultrasonic signal, the network service can perform a network service operation.

20 Claims, 10 Drawing Sheets

(56) References Cited

U.S. PATENT DOCUMENTS

| | | |
|---|---|---|
| 6,950,745 B2 | 9/2005 | Agnew |
| 6,989,765 B2 | 1/2006 | Gueziec |
| 7,080,019 B1 | 7/2006 | Hurzeler |
| 7,610,145 B2 | 10/2009 | Kantarjiev |
| 7,822,426 B1 | 10/2010 | Wuersch |
| 8,140,256 B1 | 3/2012 | dos-Santos |
| 8,285,571 B2 | 10/2012 | Demirdjian |
| 8,362,894 B2 | 1/2013 | Shah |
| 8,489,119 B1 | 7/2013 | Fraccaroli |
| 8,554,608 B1 | 10/2013 | O'Connor |
| 8,646,194 B2 | 2/2014 | Podd |
| 8,799,038 B2 | 8/2014 | Chen et al. |
| 8,909,256 B2 | 12/2014 | Fraccaroli |
| 9,483,744 B2 | 11/2016 | Ford |
| 9,488,484 B2 | 11/2016 | Ford |
| 9,552,559 B2 | 1/2017 | Ford |
| 9,558,469 B2 | 1/2017 | Ford |
| 9,569,740 B2 | 2/2017 | Ford |
| 9,599,481 B2 | 3/2017 | Ford |
| 9,671,239 B2 | 6/2017 | Ford |
| 9,689,694 B2 | 6/2017 | Ford |
| 9,715,667 B2 | 7/2017 | Ford |
| 2001/0037174 A1 | 11/2001 | Dickerson |
| 2001/0056363 A1 | 12/2001 | Gantz |
| 2002/0125839 A1 | 9/2002 | Yen |
| 2003/0030666 A1 | 2/2003 | Najmi |
| 2004/0024789 A1 | 2/2004 | Ditcharo et al. |
| 2004/0049424 A1 | 3/2004 | Murray |
| 2004/0107110 A1 | 6/2004 | Gottlieb et al. |
| 2005/0153707 A1 | 7/2005 | Ledyard |
| 2005/0227704 A1 | 10/2005 | Ferra |
| 2006/0004590 A1 | 1/2006 | Khoo |
| 2006/0034201 A1 | 2/2006 | Umeda et al. |
| 2006/0059023 A1 | 3/2006 | Mashinsky |
| 2006/0200306 A1 | 9/2006 | Adamcyzk |
| 2006/0224437 A1 | 10/2006 | Gupta |
| 2006/0242154 A1 | 10/2006 | Rawat |
| 2007/0150375 A1 | 6/2007 | Yang |
| 2007/0183156 A1 | 8/2007 | Shan |
| 2007/0255627 A1 | 11/2007 | Hallowell |
| 2007/0265974 A1 | 11/2007 | Chang |
| 2007/0276595 A1 | 11/2007 | Lewinson |
| 2008/0055049 A1 | 3/2008 | Weill |
| 2008/0091342 A1 | 4/2008 | Assael |
| 2008/0195428 A1 | 8/2008 | O'Sullivan |
| 2008/0228854 A1 | 9/2008 | Grimault et al. |
| 2008/0270204 A1 | 10/2008 | Poykko |
| 2008/0277183 A1 | 11/2008 | Huang |
| 2008/0298058 A1 | 12/2008 | Kan |
| 2009/0049119 A1 | 2/2009 | Marcinkiewicz et al. |
| 2009/0143965 A1 | 6/2009 | Chang et al. |
| 2009/0176508 A1 | 7/2009 | Lubeck et al. |
| 2009/0192851 A1 | 7/2009 | Bishop |
| 2009/0216600 A1 | 8/2009 | Hill |
| 2009/0281844 A1 | 11/2009 | Probst |
| 2009/0313077 A1 | 12/2009 | Wheeler, IV |
| 2009/0326991 A1 | 12/2009 | Wei |
| 2010/0042549 A1 | 2/2010 | Adamcyzk |
| 2010/0198428 A1 | 8/2010 | Sultan et al. |
| 2010/0205017 A1 | 8/2010 | Sichelman et al. |
| 2010/0260350 A1 | 10/2010 | Chutorash |
| 2010/0292914 A1 | 11/2010 | Vepsalinen |
| 2011/0000747 A1 | 1/2011 | Wu |
| 2011/0009098 A1 | 1/2011 | Kong |
| 2011/0099040 A1 | 4/2011 | Felt et al. |
| 2011/0102165 A1 | 5/2011 | Rahamim |
| 2011/0118981 A1 | 5/2011 | Chamlou |
| 2011/0153629 A1 | 6/2011 | Lehmann et al. |
| 2011/0225269 A1 | 9/2011 | Yap et al. |
| 2011/0258623 A1 | 10/2011 | Wagner |
| 2011/0301985 A1 | 12/2011 | Camp et al. |
| 2011/0301997 A1 | 12/2011 | Gale et al. |
| 2011/0320230 A1 | 12/2011 | Podgumy |
| 2012/0041675 A1 | 2/2012 | Juliver |
| 2012/0059693 A1 | 3/2012 | Colodny et al. |
| 2012/0078672 A1 | 3/2012 | Mohebbi |
| 2012/0092194 A1 | 4/2012 | Crucs |
| 2012/0131170 A1 | 5/2012 | Spat |
| 2012/0137256 A1 | 5/2012 | Lalancette |
| 2012/0171963 A1 | 7/2012 | Tsfaty |
| 2012/0203599 A1 | 8/2012 | Choi et al. |
| 2012/0232943 A1 | 9/2012 | Myr |
| 2013/0054139 A1 | 2/2013 | Bodin |
| 2013/0073327 A1 | 3/2013 | Edelberg |
| 2013/0074111 A1 | 3/2013 | Hyde et al. |
| 2013/0090963 A1 | 4/2013 | Sharma |
| 2013/0102333 A1 | 4/2013 | Dam |
| 2013/0132140 A1 | 5/2013 | Amin |
| 2013/0144831 A1 | 6/2013 | Atlas |
| 2013/0150004 A1 | 6/2013 | Rosen |
| 2013/0171930 A1 | 7/2013 | Abheek |
| 2013/0179205 A1 | 7/2013 | Slinin |
| 2013/0179215 A1 | 7/2013 | Slinin |
| 2013/0295963 A1 | 11/2013 | Sen |
| 2013/0316727 A1 | 11/2013 | Edge |
| 2014/0011522 A1 | 1/2014 | Lin |
| 2014/0051465 A1 | 2/2014 | Ruys et al. |
| 2014/0067488 A1 | 3/2014 | James |
| 2014/0081764 A1 | 3/2014 | James |
| 2014/0082069 A1 | 3/2014 | Varoglu et al. |
| 2014/0129135 A1 | 5/2014 | Holden et al. |
| 2014/0129951 A1 | 5/2014 | Amin |
| 2014/0130387 A1 | 5/2014 | Podd |
| 2014/0149544 A1 | 5/2014 | Le Nerriec |
| 2014/0156556 A1 | 6/2014 | Lavian |
| 2014/0164559 A1 | 6/2014 | Demeniuk |
| 2014/0223787 A1 | 8/2014 | Richmond |
| 2015/0324945 A1 | 1/2015 | Ford |
| 2015/0046080 A1 | 2/2015 | Wesselius |
| 2015/0127439 A1* | 5/2015 | Campos De Figueiredo Faceira ............ G06Q 30/0222 705/14.16 |
| 2015/0154810 A1 | 6/2015 | Tew |
| 2015/0161564 A1 | 6/2015 | Sweeney |
| 2015/0310868 A1 | 10/2015 | Mallik |
| 2015/0317568 A1 | 11/2015 | Grasso |
| 2015/0323327 A1 | 11/2015 | Ford |
| 2015/0323329 A1 | 11/2015 | Ford |
| 2015/0323330 A1 | 11/2015 | Ford |
| 2015/0323331 A1 | 11/2015 | Ford |
| 2015/0324334 A1 | 11/2015 | Ford |
| 2015/0324717 A1 | 11/2015 | Lord |
| 2015/0324734 A1 | 11/2015 | Ford |
| 2015/0325158 A1 | 11/2015 | Ford |
| 2015/0339923 A1 | 11/2015 | Konig |
| 2015/0345743 A1 | 12/2015 | Trincia |
| 2015/0345951 A1 | 12/2015 | Dutta |
| 2016/0019728 A1 | 1/2016 | Petrie |
| 2016/0027306 A1 | 1/2016 | Lambert |
| 2016/0034828 A1 | 2/2016 | Sarawgi |
| 2016/0042303 A1 | 2/2016 | Medina |
| 2016/0117610 A1 | 4/2016 | Ikeda |
| 2016/0138928 A1 | 5/2016 | Guo |
| 2016/0180346 A1 | 6/2016 | Cheng |
| 2016/0356615 A1 | 12/2016 | Arata |
| 2016/0364678 A1 | 12/2016 | Cao |
| 2016/0377445 A1 | 12/2016 | Rodoni |
| 2016/0378303 A1 | 12/2016 | Crilley |
| 2017/0017374 A1 | 1/2017 | Herz |
| 2017/0126810 A1 | 5/2017 | Kentley |
| 2017/0193404 A1 | 7/2017 | Yoo |
| 2017/0300848 A1 | 10/2017 | Shoval |
| 2018/0198535 A1* | 7/2018 | Cirit ............... H04B 11/00 |

FOREIGN PATENT DOCUMENTS

| | | |
|---|---|---|
| CN | 202213529 | 5/2012 |
| GB | 2473831 | 3/2011 |
| JP | 1992027220 | 5/1990 |
| JP | 2000082199 | 3/2000 |
| JP | 2004-302941 | 10/2004 |
| JP | 2004-362271 | 12/2004 |
| JP | 3934985 | 6/2007 |
| JP | 2012088925 | 5/2012 |

(56) References Cited

FOREIGN PATENT DOCUMENTS

| JP | 2014-130552 | 6/2014 | | |
|----|----|----|----|----|
| JP | 2004-073639 | 5/2015 | | |
| KR | 10-2010-0053717 | 5/2010 | | |
| KR | 10-2012-0090480 | 8/2012 | | |
| KR | 10-2014-0124137 | 10/2014 | | |
| KR | 10-2015-0045962 | 4/2015 | | |
| WO | WO 1999/044186 | 2/1999 | | |
| WO | WO 1999044186 | 9/1999 | | |
| WO | WO 2005/013588 | 2/2005 | | |
| WO | WO-2009023295 | 2/2009 | | |
| WO | WO 2011067741 | 6/2011 | | |
| WO | WO-20110069170 | 6/2011 | | |
| WO | WO 2014106617 | 7/2014 | | |
| WO | WO-2018128781 A1 * | 7/2018 | ............. | H04B 11/00 |

OTHER PUBLICATIONS

International Search Report in PCT/US2015/014406 dated May 13, 2015.
Office Action dated Feb. 8, 2017 in Canadian App. No. 2,948,472.
Office Action dated Mar. 3, 2017 in Australian App. No. 2015259802.
Examinatiion Report dated Oct. 12, 2017 in Australian App. No. 2017206210.
Office Action dated Dec. 19, 2017 in Chinese Application No. 201508831578.6.
Office Action dated Feb. 15, 2018 in Australian Application No. 2017265095.
Office Action dated Apr. 17, 2018 in Japanese Application No. 2016567642.
Office Action dated Apr. 16, 2018 in Australian Application No. 2017206210.
Office Action dated Jul. 3, 2018 in EP 15792139.6.
Office Action dated Oct. 10, 2018 in AU 2017206210.
Office Action dated Nov. 8, 2018 in CN 201580031578.6.
Office Action dated Dec. 4, 2018 in EP 15792139.6.
Office Action dated Feb. 6, 2019 in AU 2017265095.
International Search Report in PCT/US2015/014743 dated May 13, 2015.
International Prelimniary Report on Patentability in PCT/US2015/014743 dated Aug. 18, 2016.
EESR in EP 15745931.4 dated May 30, 2017.
Branscombe, M.; Use your phone to control your car using MirrorLink (Aug. 1, 2012; Tech Radar, pp. 1-2, http: // www.techradar. Com/news/car-tech/use-your-phone-to-control-your-car-sing-mirrorlink-1090628 (Year: 2012).
Dillow, C.: "Without Smarts, New York's 'Taxi of Tomorrow' is Really the Taxi of Yesterday" (Apr. 10, 2012); Popular Science, https://www.popsci.Com/cars/article/2012-04/without-connectivity-new-yorks-new-taxi-tomorrow-really-taxi-yesterday (Year: 2012).
Office Action in EP15745931.4 dated Mar. 2, 2018.
Office Action in CN 2015800072642 dated Nov. 26, 2018.
Hai Yang et al. "Equilibria of bilateral taxi-customer searching and meeting on networks", Transportation Research Part B., 2010, vol. 44, pp. 1067-1083.
International Search Report in PCT/US2015/034831 dated Sep. 24, 2015.
International Search Report in PCT/US2015/043654 dated Nov. 26, 2015.
International Search report in PCT/US2016/016858 dated May 19, 2016.
IPRP in PCT/US2014/069602 dated Jun. 14, 2016.
Alfred Round, et al.: Future Ride: Adapting New Technologies to Paratransit in the United States, UC Transportation Center Berkeley, CA, UCTC No. 306 (1996).
Kikuchi, et al., "Advanced Traveler Aid Systems for Public Transportation", US Department of Transportation, Sep. 1994.
Fu, et al., "On-Line and Off-Line Routing and Scheduling of Dial-a-Ride Paratransit Vehicles", Computer-Aided Civil and Infrastructure Engineering 14 (1999).
International Search Report and Written Opinion issued in PCT/US2016/062344 dated Jan. 31, 2017.
Extended Search Report issued in EP 14869805.3 dated May 10, 2017.
Extended Search Report issued in EP 15826507.1 dated Nov. 10, 2017.
International Search Report in PCT/US2017/053065 dated Sep. 22, 2017.
Written Opinion issued in SG 11201700669R dated Dec. 5, 2017.
Robert Kuhlthau and Ira D. Jacobson, The Development of a Model for Predicting Passenger Acceptance of Short Haul Air Transportation Systems, NASA, Sep. 1977.
Xing Wang, Optimizing Ride Matches for Dynamic Ride Sharing Systems, GIT, May 2013.
International Search Report issued in PCT/US2017/053065 dated Dec. 13, 2017.
First Examination Report in EP 14869806.3 dated May 4, 2018.
Aloizio P. Silva, A Mobile Location-Based Vehicle Fleet Management Service Application, 0-7803-78482/03 2003, IEEE.
Andersson, Magnus, Peer-to-Peer Service Sharing Platforms: Driving Share and Share Alike on a Mass-Scale, Thirty Fourth International Conference on Information Systems, Milan 2013, pp. 1-15 (2013).
Examination Reported in AU 2017342747 dated Apr. 8, 2019.
IPRP in PCT/US2017/053065 dated Apr. 25, 2019.
Office Action in CN 2015800072642 dated May 8, 2019.

* cited by examiner

METHOD AND SYSTEM FOR ULTRASONIC PROXIMITY SERVICE

BACKGROUND

Ultrasound is a set of audio frequencies beyond the range of human hearing, defined to be 20 kHz and above. However, most people cannot hear sounds above 18 kHz. Every day use of ultrasonic frequencies (or frequencies higher than most people can hear) is underutilized. For example, while most smartphones have the capability to play ultrasonic frequencies, they are not typically utilized.

BRIEF DESCRIPTION OF THE DRAWINGS

The disclosure herein is illustrated by way of example, and not by way of limitation, in the figures of the accompanying drawings in which like reference numerals refer to similar elements, and in which.

DETAILED DESCRIPTION

Disclosed are systems, methods, and computer-readable storage media for utilizing ultrasonic frequencies in network service operations. Examples as described include a system or computing device which utilize ultrasonic signals in connection with augmenting or enhancing device or network service operations. In some examples, a computing device operates to detect an ultrasonic signal, and based on the ultrasonic signal, performs an operation in connection with a network service that utilizes the computing device. Examples of operations which a computing device can perform include: device fingerprinting, estimating rough volumetric outlines in a space, estimating a time distance of arrival ("TDOA") in a transport facilitation context, and/or estimating total number of bodies in a space. In some implementations, a computing device can operate to emit or output an ultrasonic signal for one of (i) reception by another computing device, or (ii) reception of an echo or other return signal.

According to some examples, the computing device can perform operations utilizing a network service or computer system to: (i) authenticate a mobile device or a person carrying or associated with a mobile computing device; (ii) enable computing devices to exchange data through ultrasonic signals (e.g., to pair or associate accounts or identifiers of devices); (iii) determine and utilize information about a vehicle's occupancy or interior; and/or (iv) position or remotely identify an object associated with a transmitting device (e.g., approaching vehicle).

System Description

Figure 1A:
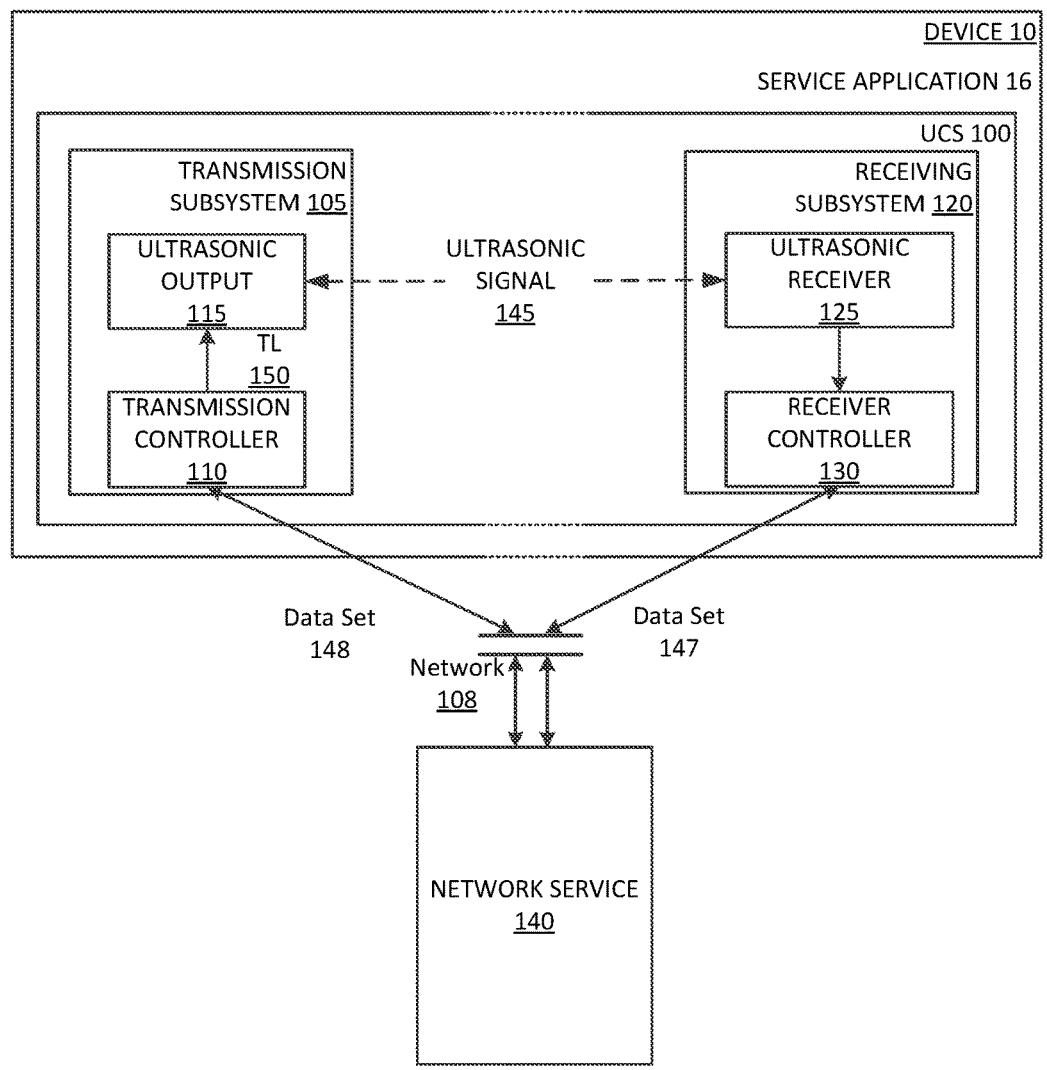
FIG. 1A illustrates an example ultrasonic communication system (UCS) for enabling use of ultrasonic signals on computing devices of users.

FIG. 1A illustrates an example ultrasonic communication system (UCS) for enabling use of ultrasonic signals on computing devices of users. In an example of FIG. 1A, a computing device 10 can include functionality for implementing UCS 100. In some examples, the computing device 10 can correspond to a mobile device of a user. Furthermore, the computing device 10 can execute an application to provide functionality of generating and/or receiving ultrasonic signals. In some examples, one or multiple computing devices 10 execute a service application 16 to implement UCS 100. Among other functions, the service application 16 can enable the computing device 10 to establish and exchange communications with a network service 140. Additionally, the service application 16 can enable the computing device 10 to utilize a combination of wireless networks (e.g., cellular, Wireless Fidelity or WiFi networks, etc.) and/or the Internet to establish a socket or other communication channel with a physical or virtual server of the network service 140.

In some examples of FIG. 1A, UCS 100 includes a transmission subsystem 105 and/or a receiving subsystem 120. In some implementations, such as in the example of FIG. 1A, the transmission subsystem 105 and the receiving subsystem 120 can be both implemented on the computing device 10. In other implementations, the transmission subsystem 105 and the receiving subsystem 120 are implemented on different computing devices (e.g., a first computing device of a first user and a second computing device of a second user).

Transmission subsystem 105 can include a transmission controller 110 and an ultrasonic output component 115. For example, the ultrasonic output component 115 can include a speaker on computing device 10. The speaker can be operated to emit sound waves (e.g., ultrasonic sound waves or "ultrasonic signals"). In some examples, the transmission controller 110 is implemented using a processor that executes corresponding logic. For example, the transmission controller 110 can be implemented by a processor of a computing device executing a service application that enables the processor and/or other logic to cause the ultrasonic signal 145 to be output from the ultrasonic output component 115.

In some examples, the receiving subsystem 120 can include a receiver controller 130 and an ultrasonic receiver 125. The ultrasonic receiver 125 can be configured to receive ultrasonic signals. In some implementations, the receiver controller 130 can determine whether the ultrasonic receiver 125 has detected an ultrasonic signal.

In some implementations, the computing device 10 with a receiving subsystem 120 can detect an ultrasonic signal outputted by a transmission subsystem 105. In such implementations, the transmission subsystem 105 and the receiving subsystem 120 can be on separate devices. For example, the transmission controller 110 can instruct the ultrasonic output component 115 to emit or output an ultrasonic signal 145. The ultrasonic signal 145 can include characteristics or attributes to enable use of the signal for any one of multiple possible purposes. In some implementations, the transmission controller 110 can instruct the ultrasonic output component 115 to emit a high frequency range (above 18 kHz)

or an ultrasonic frequency range. In some implementations, the computing device 10 can transmit data through outputted ultrasonic signals. For example, the transmission controller 110 can cause the ultrasonic output component 115 to output a set of ultrasonic signals that corresponds to a data frame. In other implementations, the computing device 10 can transmit a unique identifier in the form of one or more ultrasonic signals.

Still further, in some examples, the receiver controller 130 can be operable to implement the ultrasonic receiver 125 as any one or more of multiple types of sensor components (e.g., accelerometer, microphone, gyroscope, elector acoustic transducer, etc.) that are responsive to an acoustic signal in the ultrasonic range or a high frequency range (above 18 kHz). In some implementations, the computing device 10, by using the ultrasonic receiver 125 and the receiver controller 130, can detect and process ultrasonic signals for a variety of purposes. For example, the computing device 10 can verify device or user identification by detecting and processing ultrasonic signals. In other implementations, the computing device 10, by using the ultrasonic receiver 125 and the receiver controller 130, can detect and process ultrasonic signals to fingerprint a device. In yet other implementations, the computing device 10, by using the ultrasonic receiver 125 and the receiver controller 130, can detect and process sets of ultrasonic signals to determine corresponding data frames.

In some implementations, as illustrated in FIG. 1A, the network service 140 can instruct the transmission controller 110 (through network 108) to cause the ultrasonic output component 115 to output one or more ultrasonic signal(s) 145. In other examples, a user input can trigger the transmission controller 110 to cause the ultrasonic output component 115 to output one or more ultrasonic signal(s) 145. According to examples herein, an ultrasonic signal(s) 145 can include a frequency range. In some instances, the frequency range can extend from 19 kHz to 20 kHz. In some implementations, the ultrasonic signal(s) 145 are monotone.

As illustrated in FIG. 1A, the network service 140 communicates with at least one of the transmission subsystem 105 or the receiving subsystem 120. For example, the network service 140 can be in communication with the receiving subsystem 120 when the ultrasonic receiver 125 detects an ultrasonic signal transmitted as input from the transmission subsystem 105. In some examples, the receiver controller 130 can determine when the ultrasonic receiver 125 detects the ultrasonic signal 145 transmitted from the transmission subsystem 105, and transmit data set 147 provided with the ultrasonic signal 145 to the network service 140. The data set 147 can include data related to the characteristics of the ultrasonic signal 145, such as the frequency, amplitude, duration, or waveform of the ultrasonic signal. The ultrasonic signal 145 can be generated from another device (operating as the transmission subsystem 105) or from the same device (operating as both the transmission subsystem 105 and the receiver subsystem 120). The receiving subsystem 120 can transmit the data set 147 to the network service 140 as, for example, a parameter or set of parameters for a request. Likewise, the network service 140 may transmit a data set 149 to the transmission subsystem 105. The data set 149 can include instructions for the transmission subsystem 105 to execute. For example, the transmission subsystem 105 can determine, from the data set 149, one or more characteristics for an ultrasonic signal 145 to be outputted from the transmission subsystem 105.

In some implementations, the receiving subsystem 120 can determine that a detected ultrasonic signal is a resonant frequency of a component. In some examples, the detected ultrasonic signal 145 is the resonant frequency of an electroacoustic transducer. In other examples, the detected ultrasonic signal 145 is the resonant frequency of a gyroscope. In other examples, the detected ultrasonic signal 145 is the resonant frequency of an accelerometer.

In examples in which the transmission subsystem 105 and the receiving subsystem 120 are both provided on a computing device (e.g., the computing device 10, such as illustrated in FIG. 1A), the transmission subsystem 105 can be implemented using instructions which cause the computing device to transmit (or operate in a transmission mode) or output an ultrasonic signal, using the ultrasonic output component 115. The ultrasonic signal can have characteristics specified by transmission logic (TL) 150 of transmission controller 110. For example, in some implementations, the network service 140 can transmit data set 148 to transmission controller 110. Data set 148 can specify the characteristics of an ultrasonic signal to be emitted from ultrasonic output 115. In response to receiving data set 148, transmission 110 can transmit TL 150 to ultrasonic output 115. TL 150 can include the characteristics of an ultrasonic signal specified in data set 148. Ultrasonic 115 can then emit an ultrasonic signal with characteristics specified by TL 150/ data set 148. The characteristics may include, for example, the frequency, amplitude, duration, modulation or waveform. The receiving subsystem 120 can use instructions) to detect an ultrasonic signal, and to process (e.g., interpret) a detected ultrasonic signal. In examples in which the computing device 10 includes the transmission subsystem 105 and the receiving subsystem 120, the transmission of the ultrasonic signal can be in response to a network service operation, while, the reception of the ultrasonic signal can be used to select a network service operation or extend functionality of a network service operation. In some implementations, the receiving subsystem 120 can select a network service operation to perform based on the extracted signal features from the transmission or reception of the detected ultrasonic signal. In some examples, the network operation can be to, for example, (i) authenticate a person or a device held by a person, through unique signal characteristics of the ultrasonic signal 145, (ii) determine the number of bodies in a given space (e.g., within a vehicle); (iii) determine a size of a given space; and/or (iv) determine the TDOA of another device.

Figure 1B:
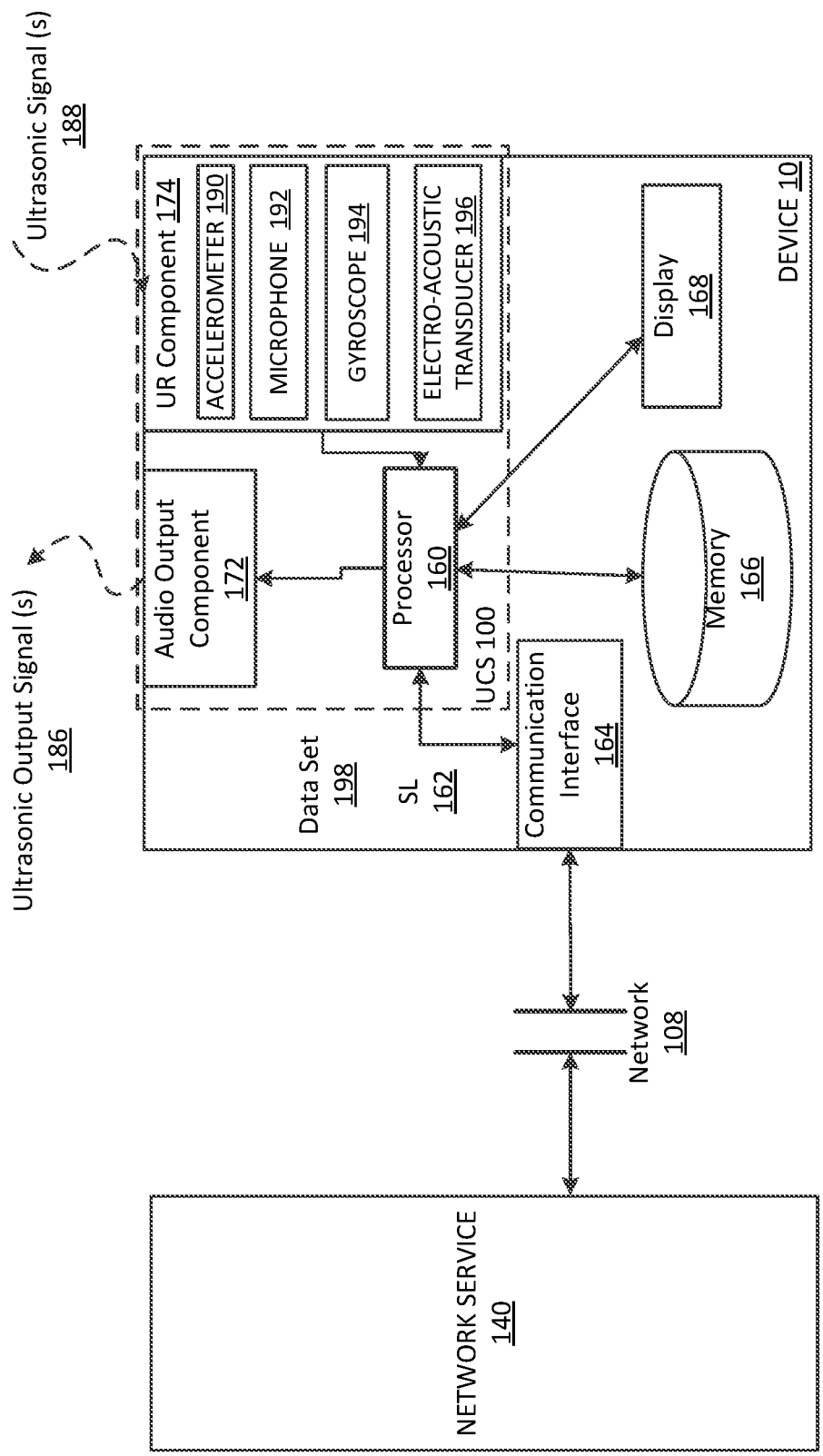
FIG. 1B illustrates a network service that utilizes computing devices which transmit and/or receive ultrasonic signals to perform various service related operations.

FIG. 1B illustrates a network service that utilizes computing devices which transmit and/or receive ultrasonic signals to perform various service related operations. In an example of FIG. 1B, UCS 100 is implemented on a computing device 10 to both receive and transmit ultrasonic signals. In one implementation or mode of operation, UCS 100 is implemented by a processor 160, which executes service logic (SL) 162. SL 162 can cause the audio output component 172 to emit an ultrasonic output signal 186. Additionally, in another mode of operation, UCS 100 is implemented by the processor 160 executing SL 162 to detect and process an inbound ultrasonic signal 188. In this way, the functionality of the transmission controller 110 and the receiver controller 130 can be implemented on processor 110.

The processor 160 can be configured to manage the functionality of UCS 100. For example, the processor 160 can operatively or modally communicate with the audio output component 172 and the ultrasonic receiving (UR) component 174. The audio output component 172 and the UR component 174 provide examples of the ultrasonic output component 115 of the transmission subsystem 105 and the ultrasonic receiver 125 of the receiving subsystem 120, respectively.

According to examples, the UR component 174 includes one or more ultrasonic receptive devices. While many conventional approaches rely exclusively on microphones to detect any form of audio, examples as described recognize that numerous kinds of sensors include a sensory medium that is responsive in some form to an ultrasonic signal. Accordingly, examples provide that the UR component 174 includes one or more sensors, which can include an accelerometer 190, a microphone 192, a gyroscope 194, and/or an elector acoustic transducer 196. When multiple sensors are used for the UR component 174, the additional resulting inputs can be used to confirm or provide additional confidence as to the manner in which a particular ultrasonic signal is interpreted.

According to some examples, the computing device 10 can include a display 168, a communication interface 164 and a memory 166. Additionally, the processor 160 can operatively communicate with the display 168, the communication interface 164 and the memory 166. The communication interface 164 can be configured to transmit data between UCS 100 (through the processor 110) and the network service 140. The memory 166 can correspond to, for example, a local memory resource for the computing device 10. The display 168 can employ any suitable display technology. For example, the display 168 can be a liquid crystal display, a plasma display, a light emitting diode display, an OLED (organic light-emitting diode) display, an electronic paper display, or any other suitable type of display able to present digital content thereon. In some examples, the display 168 can have a touch sensor associated with the display 168 to provide a touchscreen display configured to receive touch inputs for enabling interaction with a graphical user interface presented on the display 168. In some implementations, the network service 140 can cause the processor 160 to provide notifications to the display 168. In other implementations, a user input can trigger the processor 160 to provide notifications to the display 168.

In some implementations, UCS 100 can store data related to detected ultrasonic signals 188 (e.g., time of detection, frequency ranges related to the detected ultrasonic signals, etc.). For example, as illustrated in FIG. 1B, data related to detected ultrasonic signals 188 can be stored in the memory 166. Additionally, the memory 166 can store other kinds of data, including instructions and application data for implementing the service application, from which outbound ultrasonic signal 186 can be generated, and inbound ultrasonic signal 188 can be detected and processed. In some implementations, the network service 140 can be a transport facilitation system, such as shown with an example of FIG. 2.

Figure 2:
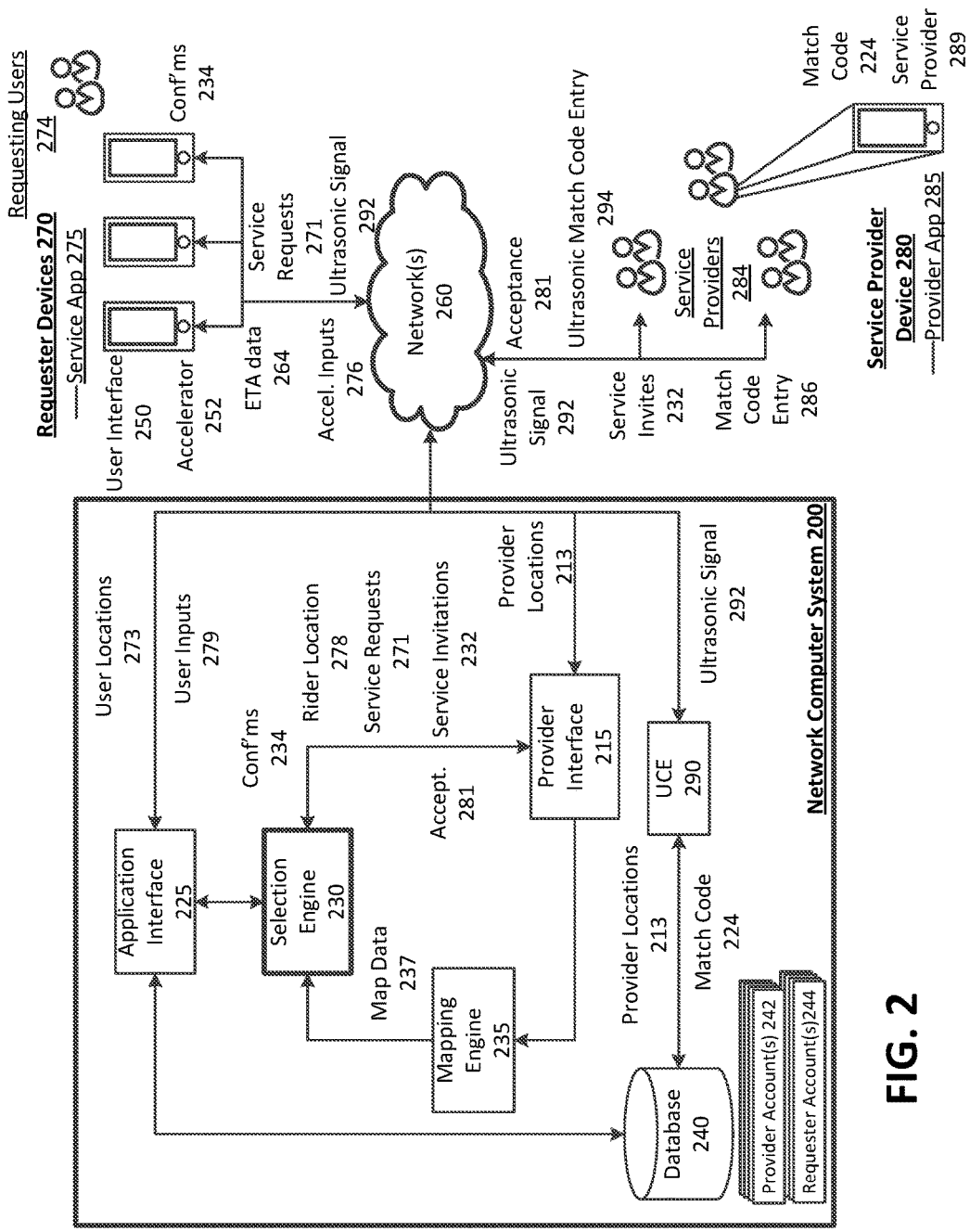
FIG. 2 illustrates an example transport facilitation system in communication with user and provider devices.

FIG. 2 illustrates a network computer system to facilitate service providers using ultrasonic-capable mobile devices. In one example, a network computer system 200 includes mobile devices for service providers (e.g., service providers 284, service provider devices 280) and requesting users (e.g., requesting users 274, requester devices 270). In some implementations, service provider devices 280 can include transmission subsystem 105 (FIG. 1A) and requester devices 270 can include receiving subsystem 120 (FIG. 1A), while in variations, service provider devices 280 can include receiving subsystem 120 and requester devices 270 can include transmission subsystems 105. In other implementations, either of the service provider device 280 or requester device 270 can include functionality of the UCS 100.

The network computer system 200 can manage an on-demand network service that connects requesting users 274 with service providers 284 that are available to service the users' 274 service requests 271. The on-demand network-based service can provide a platform that enables on-demand services (e.g., transport or ride sharing services, delivery services, etc.) between requesting users 274 and available service providers 284 by way of a service application 275 executing on the requester devices 270, and a service provider application 285 executing on the service provider devices 280. As used herein, a requester device 270 and a service provider device 280 can comprise a computing device with functionality to execute a designated application corresponding to the transportation arrangement service managed by the network computer system 200. In many examples, the requester device 270 and the service provider device 280 can comprise mobile computing devices, such as smartphones, tablet computers, VR or AR headsets, on-board computing systems of vehicles, and the like. Example on-demand network-based services can comprise on-demand delivery, package mailing, shopping, construction, plumbing, home repair, housing or apartment sharing, etc., or can include transportation arrangement services implementing a ride sharing platform.

The network computer system 200 can include an application interface 225 to communicate with requester devices 270 over one or more networks 260 via a service application 275. According to examples, a requesting user 274 wishing to utilize the on-demand network-based service can launch the service application 275 and transmit a service request 271 over the network 260 to the network computer system 200. In certain implementations, the requesting user 274 can view multiple different service types managed by the network computer system 200, such as ride-pooling, a basic ride share services, a luxury vehicle service, a van or large vehicle service, a professional driver service (e.g., where the service provider is certified), a self-driving vehicle transport service, and the like. The network computer system 200 can utilize the service provider locations 213 to provide the requester devices 270 with ETA data 264 of proximate service providers for each respective service. For example, the service application 275 can enable the user 274 to scroll through or view each service type. In response to a soft selection of a particular service type, the network computer system 200 can provide ETA data 264 on a user interface of the service app 275 that indicates an ETA of the closest service provider for the service type, and/or the locations of all proximate available service providers for that service type. As the user scrolls through each service type, the user interface can update to show visual representations of service providers (e.g., vehicles) for that service type on a map centered around the user 274 or a pick-up location set by the user. The user can interact with the user interface of the service app 275 to select a particular service type, and transmit a service request 271.

In some examples, the service request 271 can include a service location within a given region (e.g., a pick-up location within a metropolitan area managed by one or more datacenters corresponding to the network computer system 200) in which a matched service provider is to rendezvous with the requesting user 274. The service location can be inputted by the user by setting a location pin on a user interface of the service app 275, or can be determined by a current location of the requesting user 274 (e.g., utilizing location-based resources of the requester device 270, such as a global positioning system (GPS) receiver). Additionally, for on-demand transport services, the requesting user 274 can further input a destination during or after submitting the service request 271.

In various implementations, the network computer system 200 can further include a selection engine 230 to process the service requests 271 in order to ultimately select service providers 284 to fulfill the service requests 271. The network computer system 200 can include a service provider interface 215 to communicate with the service provider devices 280 via the service provider application 285. In accordance with various examples, the service provider devices 280 can transmit their current locations using location-based resources of the service provider devices 280 (e.g., GPS resources). These service provider locations 213 can be utilized by the selection engine 230 to identify a set of candidate service providers 284, in relation to the service location, that are available to fulfill the service request 271.

In certain implementations, the network computer system 200 can select a proximate self-driving vehicle (SDV) to service the service request 271 (e.g., a transportation request). Thus, the pool of proximate candidate service providers in relation to a rendezvous location can also include one or more SDVs operating throughout the given region.

In some aspects, the network computer system 200 can include a mapping engine 235, or can utilize a third-party mapping service, to generate map data 237 and or traffic data in the environment surrounding the service location. The mapping engine 235 can receive the service provider locations 213 and input them onto the map data 237. The selection engine 230 can utilize the current locations 213 of the service providers in the map data 237 (e.g., by setting a geo-fence surrounding the service location) in order to select a service provider 289 to fulfill the service request 271. The selected service provider 289 can be a service provider that is closest to the requesting user 274 with respect to distance or time, or can be a proximate service provider that is optimal for other reasons, such as the service provider's experience, the amount of time the service provider has been on the clock, the service provider's current earnings, and the like.

Once the service provider 289 is selected, the selection engine 230 can generate a service invitation 232 to service the service request 271, and transmit the service invitation 232 to the service provider's 289 device 280 via the service provider application 285. Upon receiving the service invitation 232, the service provider 289 can either accept or reject the invitation 232. Rejection of the invitation 232 can cause the selection engine 230 to determine another service provider from the candidate set of service providers 284 to fulfill the service request 271. However, if the service provider accepts (e.g., via an acceptance input), then the acceptance input 281 can be transmitted back to the selection engine 230, which can generate and transmit a confirmation 234 of the service provider 289 to the requesting user 274 via the service application 275 on the requesting user's 274 computing device 270.

In various implementations, the network computer system 200 can further include a database 240 that stores records of previously requested and/or completed services, and/or requester accounts 244 including or being associated with historical information specific to the individual requesting users 274 of the on-demand network-based service. In some implementations, as illustrated in FIG. 2, database 240 can receive requester profile 244 through application interface 225. Information specific to the individual requesting user 274 can include user preferences of service types, routine services, service locations, pick-up and destination locations, work addresses, home addresses, addresses of frequently visited locations (e.g., a gym, grocery store, mall, local airport, sports arena or stadium, concert venue, local parks, and the like). In addition, the database 240 can further store service provider accounts 242 indicating information specific to individual service providers, such as vehicle type, service qualifications, earnings data, and service provider experience.

In addition, the network computer system 200 can include a selection engine 230. The selection engine 230 can determine a service location for the requesting user 274. In some aspects, the selection engine 230 can determine a user location 278 corresponding to the requesting user's 274 current location (e.g., via GPS resources of the requester device 270). The selection engine 230 may then independently configure a service location for the requesting user 274 based on the current location. For example, the selection engine 230 can identify the user's current address as the service location, or a nearest convenient street location or address that can function as a rendezvous point between the requesting user 274 and a service provider 289 to fulfill the service request 271.

The network computer system 200 can also include an ultrasonic communication engine (UCE) 290. The ultrasonic communication engine 290 can facilitate any number of network operations to be performed on a requester device 270 and/or a service provider device 280. Examples of operations that can be performed on a requester device 270 and/or a service provider device 280 include: device fingerprinting, estimating rough volumetric outlines in a space, estimating a time distance of arrival ("TDOA") in a transport facilitation context, and/or estimating total number of bodies in a space. In some implementations, a computing device can operate to emit or output an ultrasonic signal for one of (i) reception by another computing device, or (ii) reception of an echo or other return signal.

In some implementations, the ultrasonic signatures can be used to pair or associate an account or identifier associated with a requestor device 270 with an account or identifier associated with a service provider device 280 in order to initiate the transport service. For example, the UCE 290 can generate a match code 224 that includes an ultrasonic signature. The match code 224 can be used to authorize the association of an account or identifier associated with a requestor device 270 with an account or identifier associated with a service provider device 280 in order to initiate the transport service. In some implementations, the requester device 270 includes transmission subsystem 105 (FIG. 1A) and the service provider device 280 includes receiving transmission subsystem 105 (FIG. 1A). Upon meeting an available service provider 284 or coming into a threshold distance of the available service provider 284, the requester device 270 can output a set of ultrasonic signals 292 (or alternatively, the requesting user 274 can cause ultrasonic output 115 of the requester device 270 to output a set of ultrasonic signals 292, e.g., via a selectable feature on the user interface 250), which can be detected by ultrasonic receiver 125 of the service provider device 280 to complete the association. In some instances, service provider device 280 can analyze the set of ultrasonic signals 292 from the requester device 270, to determine whether the set of ultrasonic chirps corresponds to the match code 224. If the match code 224 and set of ultrasonic signals 292 match, then provider device 280 and requester device 270 can complete the association.

In some implementations, the requester device 270 and/or service provider device 280 can request a match code 224 from network computer system 200, when the requesting user 274 and the service provider 284 are associating accounts with one another. In such an implementation, the network service system 200 can generate the match code 224 and transmit the match code 224 to the requesting device (e.g., the requester device 270 and/or the service provider device 280). The UCE 290 can associate the generated match code 224 with the account associated with the requesting device (e.g., the requester device 270 and/or the service provider device 280) and log such information into database 240.

In some implementations, the user 274 and the provider 284 can respectively perform an ultrasonic handshake. In such implementations, the requesting user 274 causes the requester device 270 to output an ultrasonic signal 292 (e.g., via an input on a selectable feature of the service application 275), and the service provider 284 causes the service provider device 280 to "listen" for the ultrasonic signal 292 (e.g., via an input on a selectable feature of the service provider application 285). In a variation of such implementations, the service provider 284 can cause the service provider device 280 to output an ultrasonic signal 292, while the requesting user 274 can cause the requester device 270 to "listen" for the ultrasonic signal 292.

In other implementations, the requester device 270 can output the ultrasonic signature in response to (i) receiving a signal from network computing system 200, (ii) receiving an input from the user to make a pick-up request when the user is within the mass egress area or (iii) detecting that requester device 270 has entered the mass egress area.

In some implementations the ultrasonic signal can be detected by other ultrasonic receivers of the requester device 270 or the service provider device 280. Examples of an ultrasonic receiver can include, for example: gyroscope, accelerometer, any electrical acoustic transducer, etc.

In some implementations, a device (e.g., the service provider device 280 or the requester device 270) can transmit data frames. For example, requester device 270 can implement the transmission subsystem 105 (FIG. 1A) to output ultrasonic signals that correspond to a data frame. In some implementations, an ultrasonic signal that sweeps up (ultrasonic signal that is transmitted from a lower frequency to a higher frequency) can correspond to a bit state of 1. Additionally, an ultrasonic chirp that sweeps down (an ultrasonic signal that is transmitted from a higher frequency to a lower frequency) can correspond to a bit state of 0. Moreover, an ultrasonic signal can correspond to the preamble of a data frame. The preamble may facilitate the receiving device (e.g., provider device 280 with receiving subsystem 120) to determine the beginning of the data frame. In some implementations, the preamble is distinguishable from a remainder of the data frame by having a much longer transmission time. For example, the first ultrasonic chirp in the set of ultrasonic signals can sweep up for 100 ms while the remainder of the ultrasonic signals can each be either a sweep up or sweep down and transmitted only for 20 ms.

Network 108 and 260 can include one or more networks. Network 108 and 260 can be a conventional type, wired or wireless, and can have numerous configurations include a star a star configuration, token ring configuration, or other configurations. Furthermore, network 108 and 260 can include an intranet, a local area network (LAN), a wide area network (WAN) (e.g., the Internet), and/or other interconnected data paths across which multiple devices can communicate. In some embodiments, network 108 and 260 can be a peer-to-peer network. Network 108 and 260 can also be coupled with or include portions of a telecommunications network for sending data using a variety of different communication protocols. In some embodiments, network 108 and 260 can include Bluetooth (or Bluetooth low energy) communication networks or a cellular communications network for sending and receiving data including via short messaging service (SMS), multimedia messaging service (MMS), hypertext transfer protocol (HTTP), direct data connection, WAP, email, etc. Although the examples of FIGS. 1A, 1B and 2, each illustrate one network 108 and 260, network 108 and 260 can be more than one network. For example, as illustrated in FIG. 1A, network service 140, transmission subsystem 105, and receiving subsystem 120 can communicate over network 108 using wired or wireless connections, or combinations thereof. In another example, as illustrated in FIG. 2, user device 270, service provider device 280 and network computing system 200 communicate over network 260 using wired or wireless connections, or combinations thereof.

Methodology

Figure 3:
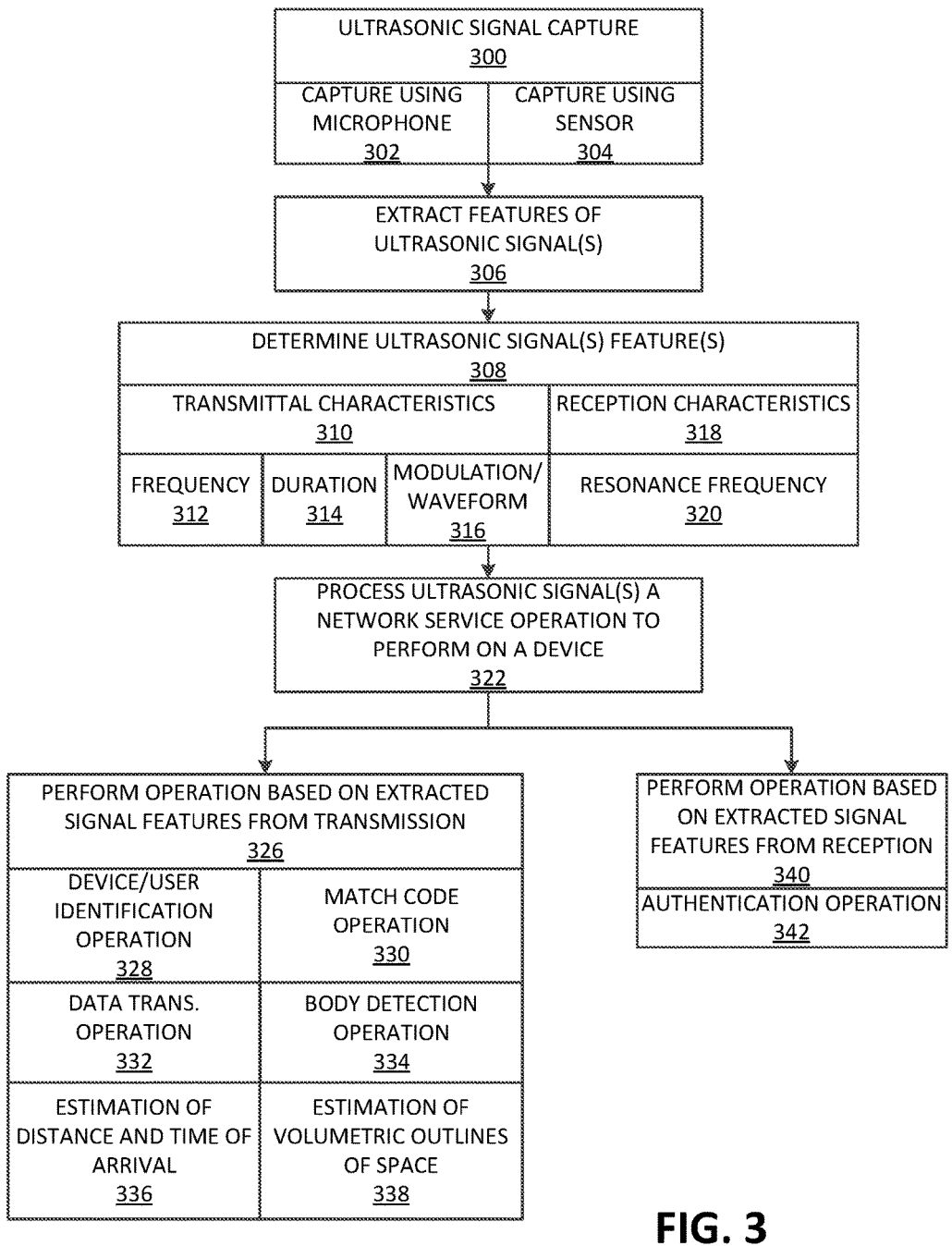
FIG. 3 illustrates an example method for processing an inbound ultrasonic signal on a computing device.
Figure 4:
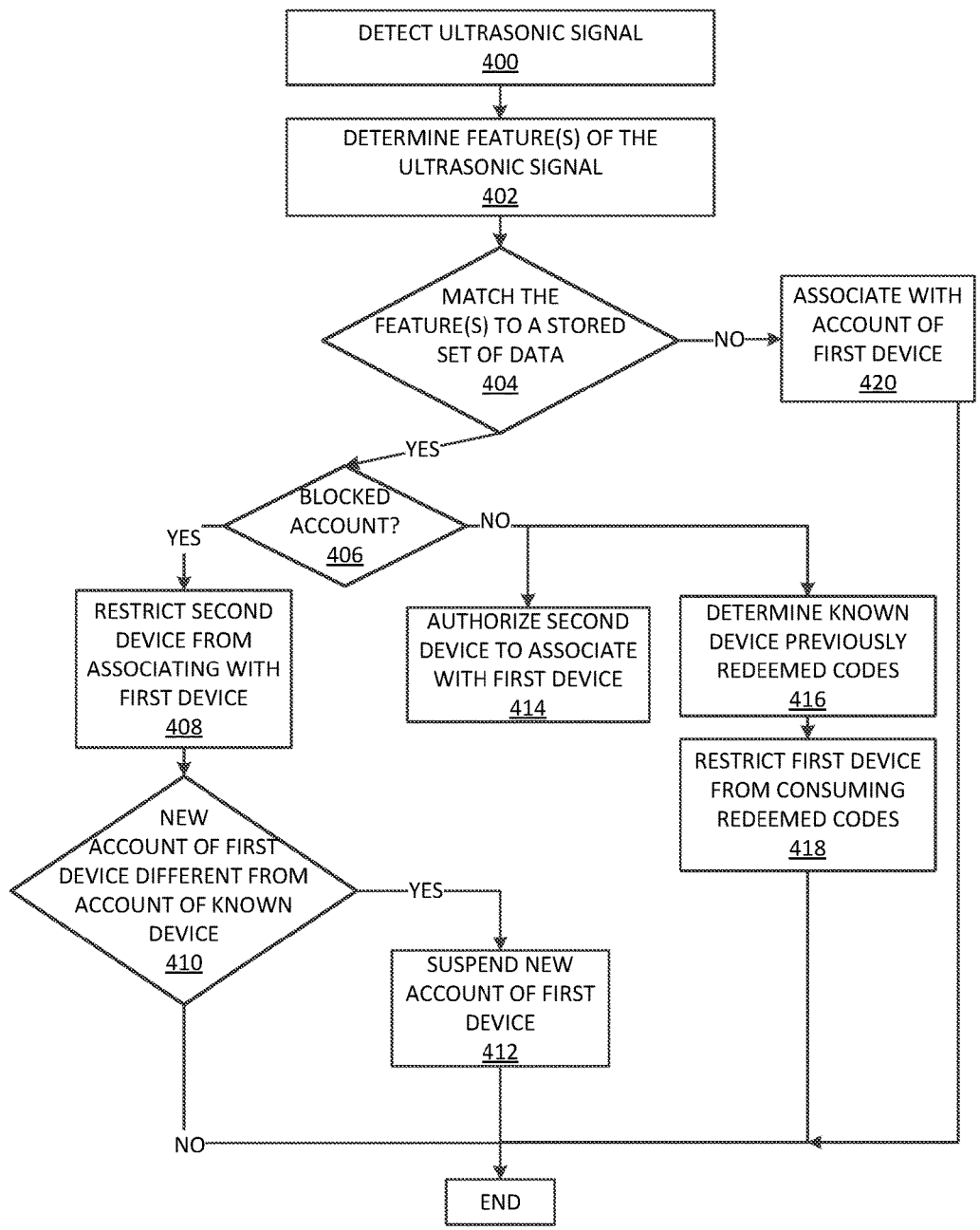
FIG. 4 illustrates an example method for utilizing ultrasonic frequencies to detect fraud and verify devices.
Figure 5:
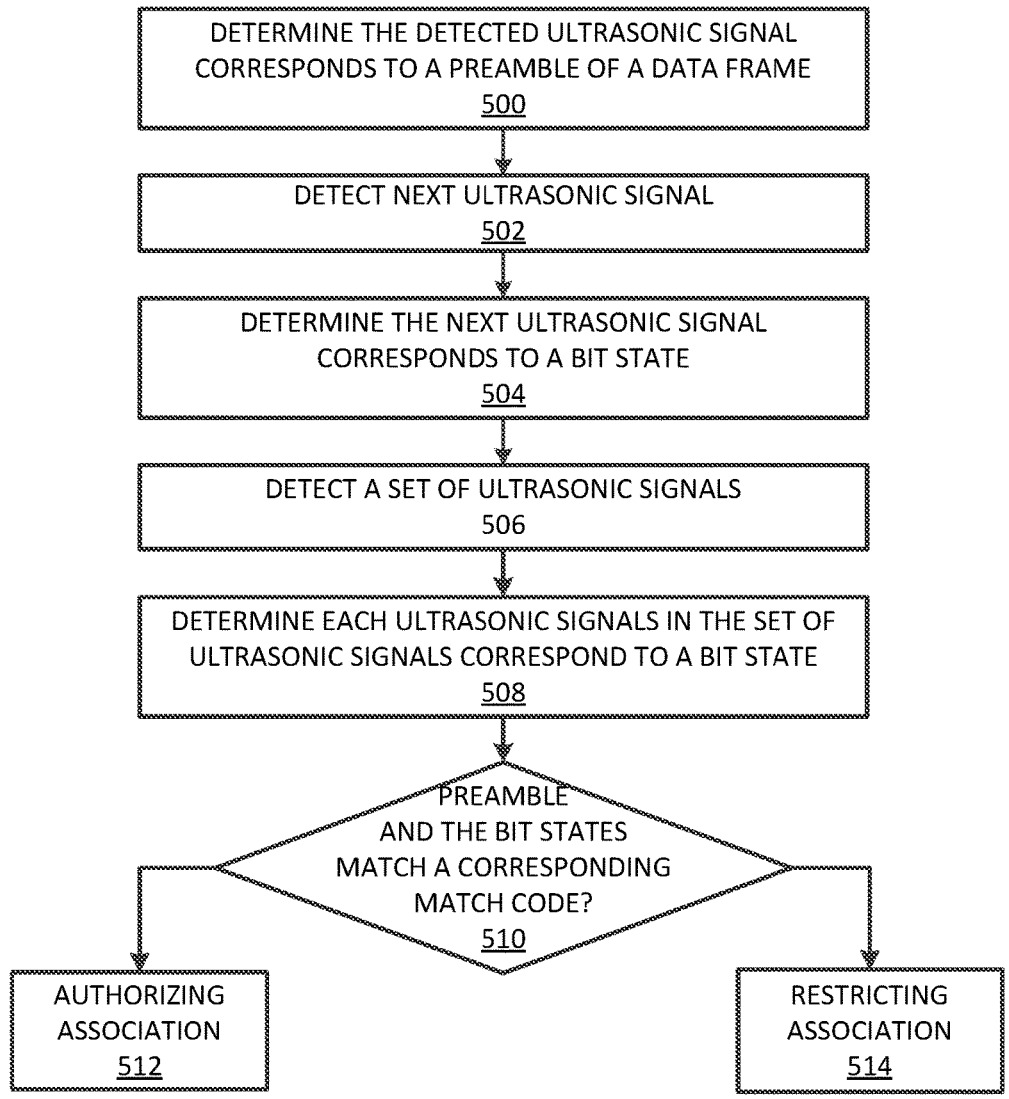
FIG. 5 illustrates an example method for utilizing ultrasonic frequencies for data transmission.
Figure 6:
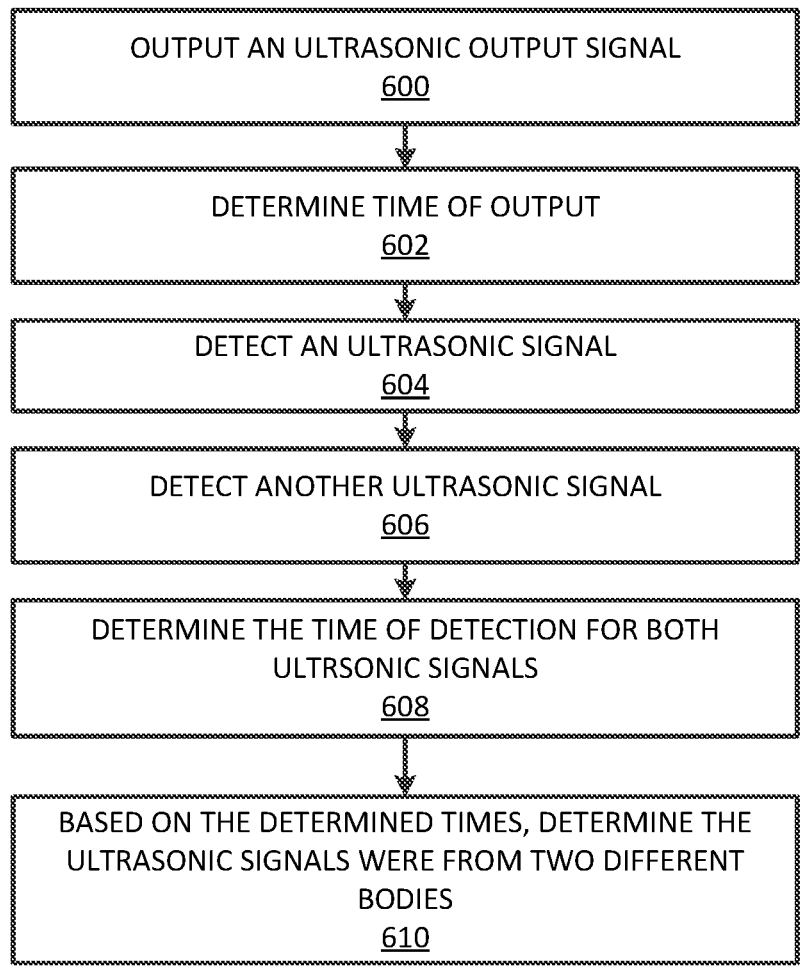
FIG. 6 illustrates an example method for utilizing ultrasonic frequencies to estimate the total number of bodies.
Figure 7:
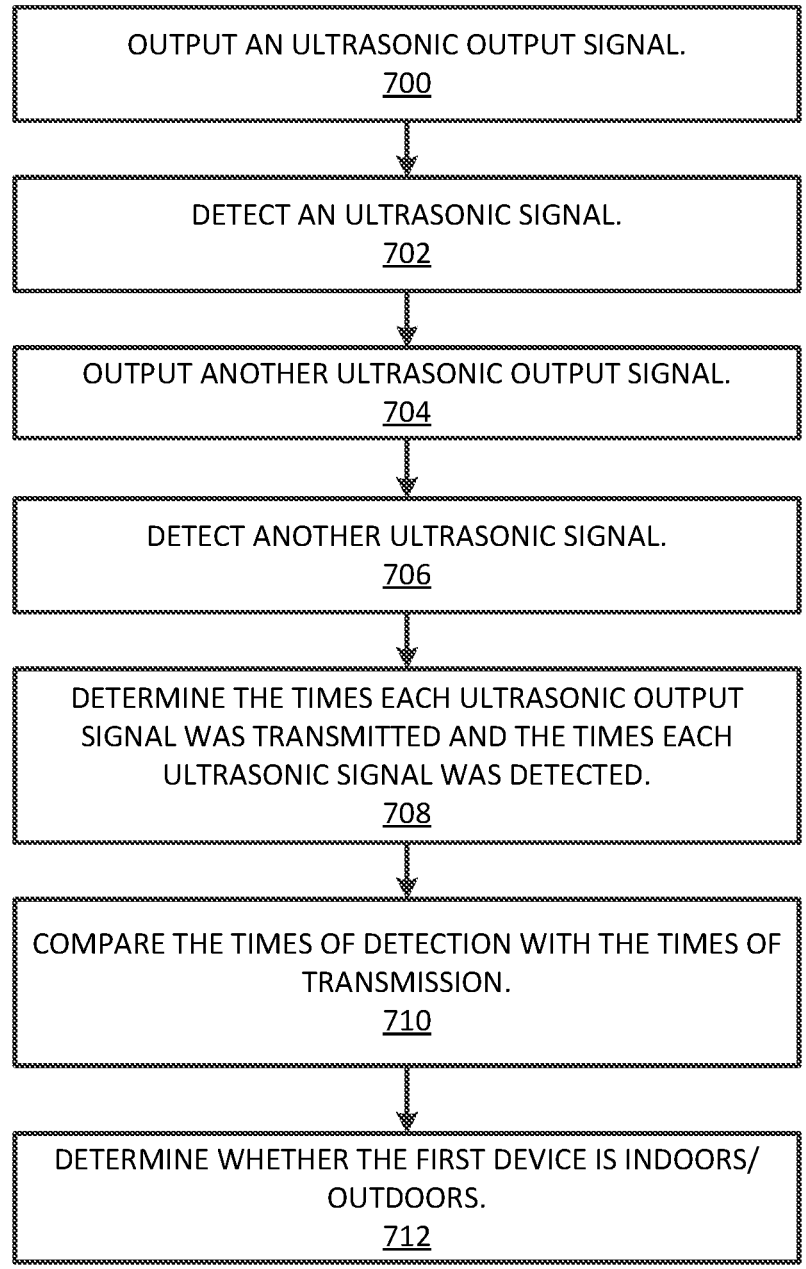
FIG. 7 illustrates an example method for utilizing ultrasonic frequencies to estimate rough volumetric outlines of a space.
Figure 8:
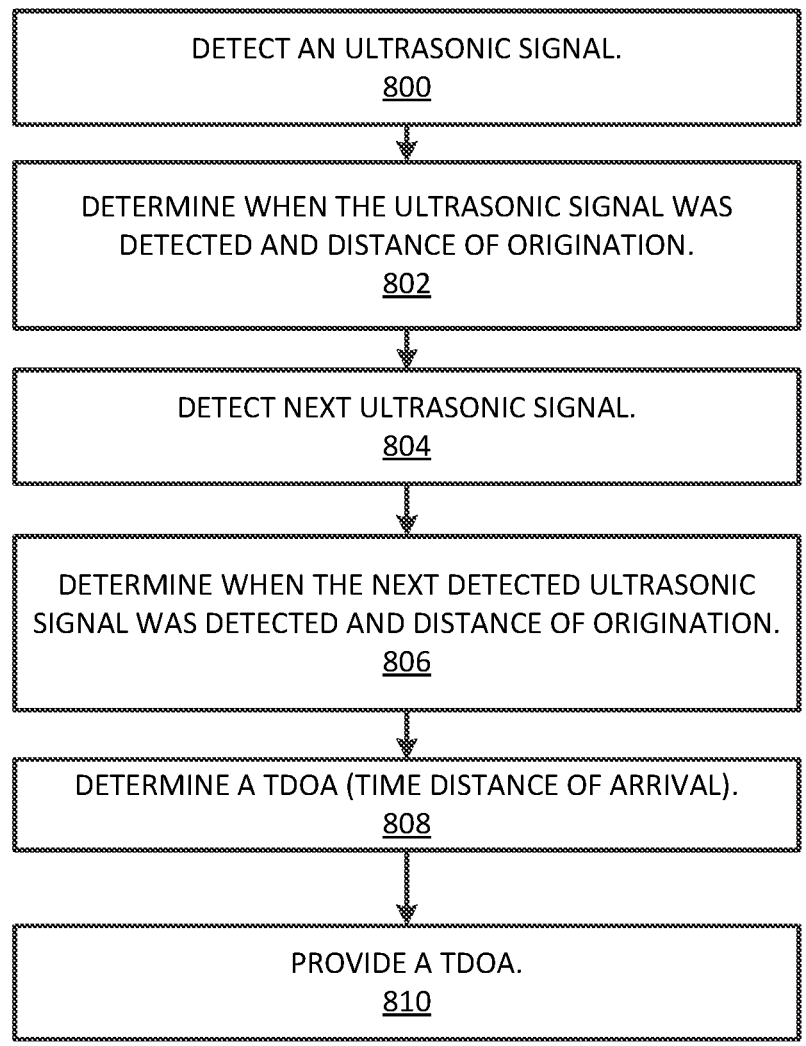
FIG. 8 illustrates an example method for utilizing ultrasonic frequencies to determine TDOA.

FIG. 3 illustrates an example method for processing an inbound ultrasonic signal on a computing device. FIG. 4 illustrates an example method for utilizing ultrasonic frequencies to detect fraud and verify devices. FIG. 5 illustrates an example method for utilizing ultrasonic frequencies for data transmission. FIG. 6 illustrates an example method for utilizing ultrasonic frequencies to estimate the total number of bodies. FIG. 7 illustrates an example method for utilizing ultrasonic frequencies to estimate rough volumetric outlines of a space. FIG. 8 illustrates an example method for utilizing ultrasonic frequencies to determine TDOA. In the below discussions of FIGS. 3 through 8, reference may be made to reference characters representing like features as shown and described with respect to FIG. 1A, 1B and/or FIG. 2 for purpose of illustrating a suitable component for performing a step or sub-step being described.

FIG. 3 illustrates an example method for processing an inbound ultrasonic signal on a computing device. In some implementations, as illustrated in FIG. 3, the computing device 10 can execute a service application 16 that listens for an ultrasonic signal (300). For example, the computing device 10 can use a microphone to detect the ultrasonic signal (302). As an addition or variation, the computing device 10 uses one or more other sensors (e.g., accelerometer, gyroscope and/or electro-acoustic transducer). Such sensor devices can include a sensor medium that generates a response to the ultrasonic signal (e.g., the sensor devices resonate at a particular frequency) (304).

The computing device 10 can extract features of the detected ultrasonic signal(s) (306). In some implementations, the computing device 10 determines features of the detected ultrasonic signal(s) (308). For example, the computing device 10 determines features of the detected ultrasonic signal based on the transmittal characteristics of the ultrasonic signal (310). Examples of transmittal characteristics of the ultrasonic signal include but are not limited to: the frequency of the ultrasonic signal (312), the duration of the ultrasonic signal (314), and/or the modulation/waveform of the ultrasonic signal (316). In other examples, the computing device 10 determines features of the ultrasonic signal(s) based on the effect of the reception of the signal on the computing device 10 (318). For example, the sensors used to capture the ultrasonic signal can resonate at a particular resonate frequency (320). In response, the computing device 10 can determine that particular resonant frequency.

The computing device 10 can process the ultrasonic signal based on the extracted features of the detected ultrasonic signal (322). In some implementations, the computing device 10 can select an operation to perform (e.g., network service based operations) based on the extracted signal features from the transmission of the detected ultrasonic signal (426). By way of example, the computing device 10 can select device/user identification operations based on the signal features that result from the transmission of the ultrasonic signal (328). Other example operations include but are not limited to, match code operation (330), data transmission/reception operation (332), body detection operation (334), TDOA estimation operation (336), volumetric outlines of space estimation operation (338), etc.

In other implementations, the computing device 10 can select an operation to perform (e.g., network service based operations) based on the extracted signal features from the reception of the detected ultrasonic signal (340). For example, the computing device 10 can perform an authentication operation based on the resonant frequency of the detected ultrasonic signal (342).

FIG. 4 illustrates an example method for utilizing ultrasonic frequencies to detect fraud and verify devices. The computing device 10 can detect an ultrasonic signal (400). In some implementations, the computing device 10 can execute a service application 16 that instructs ultrasonic receiver 125 to listen for an ultrasonic signal.

The computing device 10 can determine feature(s) of the ultrasonic signal (402). For example, the computing device 10 can determine the transmittal characteristics or the effect of the reception of the ultrasonic signal on computing device 10. In some implementations, the computing device 10 can store a collection of feature data sets. The feature data set can include identifiers related to user accounts and devices. Additionally, the feature data set can include data that quantitatively (e.g., as a feature vector) represents features of logged ultrasonic signals that are associated to the identifiers of user accounts and devices. In some implementations, the feature data set or account identifier can include or point to account data. Account data can include data related to redeemed discounts/incentives or whether the account is blocked or not-blocked (e.g., authorized). In other implementations, the network service 140 can store the collection of feature data sets. For example, the receiver controller 130 can transmit data set 147 that includes data relating to the features of detected ultrasonic signal 145 to network service 140.

The computing device 10 can determine whether the feature(s) of the detected ultrasonic signal match the features included in the stored set of data (404). For example, the receiver controller 130 can determine whether the features of the detected ultrasonic signal match any features of logged ultrasonic signals. In other implementations, the network service 140 can determine whether the features the features of the detected ultrasonic signal match any features of logged ultrasonic signals. For example, the network service 140 can compare the received data set 147 (that includes data relating to the features of detected ultrasonic signal 145) to the collection of feature data sets stored on the network service 140, in order to determine a match.

If the computing device 10 determines there is a match, the computing device 10 then determines whether the matched logged ultrasonic signal (i.e., the logged ultrasonic signal that has features that match the features of the detected ultrasonic signal) is associated with a blocked account (406). For example, the receiver controller 130 determines whether the matched logged ultrasonic signal is associated with a device identifier associated with a blocked account. In another example, the receiver controller 130 determines whether the matched logged ultrasonic signal is associated with an account identifier indicating that the account has been blocked. In some implementations, the network service 140 can determine whether the matched logged ultrasonic signal known device is associated with a blocked account. For example, the network service 140 can determine whether the matched logged ultrasonic signal is associated with an account identifier indicating that the account has been blocked. In another example, the network service 140 can determine whether the matched logged ultrasonic signal is associated with a device identifier that is associated with a blocked account.

In some examples, if the computing device 10 determines the matched logged ultrasonic signal is associated with a blocked account, the computing device 10 can restrict pairing or associating with another device (408). For example, the receiver controller 130 of the computing device 10 can transmit instructions to a device of the transmission subsystem 105 to restrict completion of associating the accounts or identifiers with one another. In some implementations, the network service 140 can transmit instructions to the computing device 10 and/or the device of the transmission subsystem 105 to restrict completion of associating the accounts or identifiers with one another.

In some implementations, the computing device 10 can determine whether the device of transmission subsystem 105 is associated with a new account (i.e., the new account is different from the blocked account of matched known device) (410). For example, the receiver controller 130 requests account data from device of the transmission subsystem 105. In response to receiving the account data, the receiver controller 130 can compare the account data of matched logged ultrasonic signal with the account data of the device of the transmission subsystem 105. In some implementations, the network service 140 can determine and suspend an existence of a new account of the device of the transmission subsystem 105. For example, the network service 140 requests account data from device of the transmission subsystem 105. In response to receiving the account data, the network service 140 compares the account data of matched logged ultrasonic signal with the account data of the device of the transmission subsystem 105.

If the computing device 10 determines a new account exists, the computing device 10 can suspend the new account (412). For example, the receiver controller 130 determines the existence of a new account associated with the device of the transmission subsystem 105. In response to that determination, the receiver controller 130 can send instructions to the network service 140 to suspend the new account of the device of the transmission subsystem 105. In some implementations, the network service 140 determines the existence of a new account associated with the device of the transmission subsystem 105. In response to that determination, the network service 140 can suspend the new account of the device of transmission subsystem 105.

However, if the computing device 10 determines that the matched logged ultrasonic signal is not associated with a blocked account (e.g., the matched logged ultrasonic signal is associated with an authorized account), the computing device 10 can authorize pairing or associating an account or identifier of the computing device 10 with the account or identifier of the device of the transmission subsystem 105 (414). For example, the receiver controller 130 can transmit instructions to the device of the transmission subsystem 105 to associate the account or identifier of the device of the transmission subsystem 105 with the account or identifier of the device of receiving subsystem 105. In some implementations, the network service 140 can send instructions to the device of the receiving subsystem 105 and/or the device of the transmission subsystem 120 to associate accounts or identifiers with one another. In some implementations, the above described techniques can be used in a network computer system 200 of FIG. 2 to associate the accounts or identifiers of two devices (e.g., service provider device 280 and requester device 270).

In some implementations, account data can be associated with data related to redeemed discounts/incentives. In such implementations, the computing device 10 can determine whether the matched logged ultrasonic signal is associated with an account associated with redeemed discount/incentives (416). In other implementations, the network service 140 can determine whether the matched logged ultrasonic signal is associated with an account associated with redeemed codes (e.g., discounts, incentives, promotions, etc.).

If the computing device 10 determines the matched logged ultrasonic signal is associated with an account associated with redeemed codes, the receiver controller 130 can transmit instructions to the network service 140 to restrict the device of the transmission subsystem 105 from consuming redeemed codes (e.g., restrict the account from being associated with the redeemed codes) (418). In some implementations, the network service 140 can send instructions to the device of the transmission subsystem 105 to restrict the device of the transmission subsystem 105 from consuming the redeemed codes. In some implementations, as illustrated in FIG. 2, the requester device 270 can be restricted from consuming redeemed codes. For example, using the techniques described above, either the service provider device 280 or the network computing system 200 can determine that the requester device 270 is associated with an account that includes data related to redeemed codes. For instance, the network computer system 200 (e.g., via the UCE 290) can analyze a specific requester profile 244 of a specific requester device 280 to determine whether requester profile 244 is associated with any redeemed codes. If the requester device 270 is associated with data related to redeemed codes, then the service provider device 280 or the network computing system 200 can restrict the requester device 270 from consuming redeemed codes.

In some implementations, the computing device 10 determines the features of the detected ultrasonic signal does not match any of the features included in the stored set of data (420). In response to that determination, the computing device 10 can infer that the detected ultrasonic signal can be associated to an unknown device and/or an unknown user account. In some implementations, the computing device 10 can request account data, user identifier and/or device identifier from the device of the transmission subsystem 105. The computing device 10 can then associate the account data, user identifier and/or device identifier of the device of the transmission subsystem 105 with the features of the detected ultrasonic signal. In other implementations, using the above described techniques, the network service 140 can associate the features of the detected ultrasonic signal to the account data, user identifier and/or device identifier of the device of transmission subsystem. For example, the receiver controller 130 can transmit data set 147 to the network service 140. Data set 147 can include data related to the feature of the detected ultrasonic signal and an indicator that the features of the detected ultrasonic signal do not match any of the features included in the stored set of data. As such, the network service 140 can request account data, user identifier and/or device identifier from the device of the transmission subsystem 105. The network service 140 can then associate the account data, user identifier and/or device identifier of the device of the transmission subsystem 105 with the features of the detected ultrasonic signal.

Ultrasonic frequencies (or frequencies above 18 kHz, for example) can be utilized to transmit data or data frames. Additionally, as described above, match codes can be transmitted through ultrasonic signals (or frequencies above 18 kHz). FIG. 5 illustrates an example method for utilizing ultrasonic frequencies for data transmission. As noted above, in some implementations, the transmission subsystem 105 can output ultrasonic chirps that correspond to a data frame. For example, an ultrasonic chirp that sweeps up (ultrasonic signal that is transmitted from a lower frequency and ends at a higher frequency) can correspond to a bit state of 1. Additionally, an ultrasonic chirp that sweeps down (an ultrasonic signal that is transmitted from a higher frequency and ends at a lower frequency) can correspond to a bit state of 0. Moreover, an ultrasonic chirp can correspond to the preamble of a data frame. The preamble could be helpful for in determining the beginning of the data frame.

Referring to FIG. 5, the computing device 10 can determine the detected ultrasonic signal 146 corresponds to a preamble (500). For example, the receiver controller 130 can determine the detected ultrasonic signal 145 corresponds to a preamble based on its transmittal features (e.g., frequency of detected ultrasonic signal, duration of detected ultrasonic signal, and/or modulation/waveform of detected ultrasonic signal. In some implementations, the duration of the ultrasonic signal can distinguish whether the ultrasonic signal corresponds to a bit state or a preamble. For example, 100 ms ultrasonic signal can correspond to a preamble while 20 ms ultrasonic signal can correspond to a bit state. For instance, the receiver controller 130 can determine a detected ultrasonic signal 145 that sweeps up for 100 ms is the preamble of the data frame. In other implementations, whether a detected ultrasonic signal (e.g., ultrasonic signal 145) is a preamble of a data frame can be dependent on whether the ultrasonic signal sweeps up or sweeps down. For example, a 100 ms ultrasonic signal that sweeps up can correspond to a preamble, while a 100 ms ultrasonic signal that sweeps down does not. In other implementations, whether a detected ultrasonic signal (e.g., ultrasonic signal 145) is a preamble can be dependent on whether the ultrasonic signal sweeps up or sweeps down and the duration of the ultrasonic signal. In some implementations, the network service 140 can determine that the detected ultrasonic signal 145 corresponds to a preamble based on its transmittal features (e.g., by receiving from receiver controller 130, the data set 147 that includes the transmittal features of the detected ultrasonic signal 145).

The computing device 10 can detect the next ultrasonic signal (502). For example, the receiver controller 130 receives data related to the detection of the next ultrasonic signal from ultrasonic receiver 125. In some implementations, the network service 140 can receive, from the receiver controller 130, a data set 147 that includes data related to the detection of the next ultrasonic signal from the ultrasonic receiver 125.

The computing device 10 can determine the next detected ultrasonic signal corresponds to a bit state (504). For example, the receiver controller 130 can determine the next detected ultrasonic signal corresponds to a bit state based on the next detected ultrasonic signal's transmittal features. In some examples, the receiver controller 130 determines the detected ultrasonic signal 145 sweeps up. The receiver controller 130 can further determine the sweeping up ultrasonic signal 145 corresponds to a bit state of 1. In other examples, the ultrasonic signal 145 sweeps down. The receiver controller 130 can further determine the sweeping down ultrasonic signal 145 corresponds to a bit state of 0. In other examples, the ultrasonic signal 145 that sweeps down can correspond to a bit state of 1, while the ultrasonic signal 145 that sweeps up can correspond to a bit state of 0. In some implementations, the network service 140 can determine the next detected ultrasonic signal 145 corresponds to a bit state based on its transmittal features (e.g., by receiving from the receiver controller 130, the data set 147 that includes the transmittal features of the detected ultrasonic signal 145).

In some implementations, the receiver controller 130 can verify that the next ultrasonic signal is part of the data frame of the previously detected preamble, by determining that the detection of the next ultrasonic signal followed the detected ultrasonic signal corresponding to the preamble. In other implementations, the network service 140 can verify that the next ultrasonic signal is part of the data frame of the previously detected preamble by determining that the detection of the next ultrasonic signal followed the detected ultrasonic signal corresponding to the preamble (e.g., by receiving from the receiver controller 130, the data set 147 that includes the transmittal features of the detected ultrasonic signal 145).

The computing device 10 can detect a set of ultrasonic signals (506) and determine what bit state each ultrasonic signal in the set of ultrasonic signals correspond to (508). For example, the receiver controller 130 can determine the detection of a set of ultrasonic signals from ultrasonic receiver 125. The receiver controller 130 determines what bit states each ultrasonic signal in the set of ultrasonic signals correspond to. In other implementations, the network service 140 or the receiver controller 130 can determine the detection of a set of ultrasonic signals from the ultrasonic receiver 125. Furthermore, the receiver controller 130 or the network service 140 can determine the bit state of each ultrasonic signal similar to the techniques disclosed above.

The computing device 10 can determine whether the determined preamble and later following bit states correspond to a match code (510). For example, the receiver controller 130 can determine whether the data frame (preamble and the bit states) corresponds to a match code. The match code can be received from a database of the network service 140. In other implementations, the receiver controller 130 can transmit data set 147 that includes data relating to the data frame to the network service 140. In response to receiving data set 147, the network service 140 can determine whether the data frame corresponds to a match code. For instance, the network service 140 can retrieve data relating to the match code in a database of the network service 140 and compare the match code to the data related to the data frame.

If the computing device 10 determines the data frame corresponds to a match code, the receiver controller 130 can authorize pairing or associating the account or identifier of another device (512). For example, the receiver controller 130 can authorize the association of the account or identifier of the receiver controller 130 device with the account or identifier of the device of the transmission subsystem 105, if the receiver controller 130 determines the data frame (preamble and bit states) corresponds to a match code. In such an example, the receiver controller 130 can transmit instructions to the device of the transmission subsystem 105 to authorize the association.

On the other hand, if the computing device 10 determines the data frame does not correspond to a match code, the computing device 10 can restrict pairing or the association of its account or identifier with the account or identifier of another device. For example, the receiver controller 130 can transmit instructions to the device of the transmission subsystem 105 to restrict the association with the device of receiving subsystem. In other implementations, the network service 140 can restrict or authorize the association. For example, the network service 140 can send instructions to authorize or restrict the association with one another, to the device of the transmission subsystem 105 and/or the device of the receiving subsystem 130.

In some implementations in the transport facilitation context, as illustrated in FIG. 2, the UCE 290 can correlate a generated match code 224 to particular devices (e.g., the requester device 270 and the service provider device 280). For example, the network computer system 200 can receive a service request 271 from the requester device 270. In response to receiving the service request 271, the UCE 290 can generate a unique match code 224 for the requester and correlate the unique match code 224 to an identifier of the requester or the requester device 270. This data can be stored in database 240. In some implementations, the UCE 290 can associate the correlated unique match code 224 and the identifier of the requester device 270 to the associated requester account 244. In order for the service provider device 280 to pair or associate its account or identifier with the account or identifier of the requester device 270, with the method described in FIG. 5, the requester device 270 can output ultrasonic match code entry 294. The ultrasonic match code entry 294 can include a data frame as described above. The service provider device 280 receives the ultrasonic match code entry 294 and provides data corresponding to the ultrasonic match code entry 294 to the UCE 290. Upon receiving the data for the ultrasonic match code entry 294, the UCE 290 can verify that the ultrasonic match code entry 294 corresponds to or is associated with the identifier of the requester or the requester device 270. If the ultrasonic match code entry 294 corresponds to the identifier of requester device 270, the associated requester account 244 and/or the unique match code 224, the UCE 290 can transmit instructions to the service provider device 280 to associate its account or identifier with the account or identifier of requester device 270 (e.g., assign the service provider to provide service for the requester). On the other hand, if the ultrasonic match code entry 294 does not correspond to the requesting user device 270, the associated requester account 244 or the unique match code 224, then the UCE 290 can transmit instructions to the service provider device 280 to restrict any associations with requester device 270.

In some implementations, the transmission subsystem 105 can send data through ultrasonic signals. For example, the transmission controller 110 can instruct the ultrasonic output 115 to emit or output a set of ultrasonic signals that correspond to a data frame. The first ultrasonic signal outputted can correspond to a preamble, while each subsequent ultrasonic signals outputted can correspond to a bit state.

Still further, in some implementations, the receiving subsystem 120 can record the set of ultrasonic signals (via UR component 124) at a native of 44.1 KHz or 48 KHz depending on device type of the receiving subsystem 120. In some instances, the outputted ultrasonic signals only occupy 1 Khz of bandwidth in the 19 KHz-20 KHz range. The receiver controller 130 first performs a baseband conversion to lower the sample rate to the 1-1.5 Khz range to reduce the amount of processing needed in later stages. Furthermore, three matched filters can be pre-calculated and stored (e.g., at the device's memory)—one for preamble detection and two for the up and down sweeps. As such, the receiver controller 130 can continually use the preamble matched filter against the converted ultrasonic signal. The receiver controller 130 can determine each peak as the start of a new data frame. Indicators such as the duration of the peak (e.g., longer corresponds to a preamble, while shorter corresponds to bit state) or the size of the peak (e.g., smaller peaks are bit states while a large peak can be the beginning of the data frame) can help decipher whether the peak is the start of the data frame or preamble. Once determining the start of the data frame, the receiver controller 130 can look for peaks in the baseband signal in the up and down matched filters in order to decode the bits (where sweep ups and sweep downs and correspond to a specific bit state).

According to some examples, ultrasonic chirps or signals can also be used to estimate total number of bodies in a space. FIG. 6 illustrates an example method for utilizing ultrasonic frequencies to estimate the total number of bodies. As illustrated in FIG. 6, a computing device 10 can emit or output an ultrasonic output signal (600). For example, a transmission subsystem 105 and a receiving subsystem 120 can be implemented on the same computing device 10 (e.g., as illustrated in FIG. 1B). The processor 160 can instruct the audio output component 172 to output ultrasonic output signal 186. Additionally, the processor 160 can log teach time the audio output component 172 outputs ultrasonic output signal 186. In some implementations, the network service 140 can instruct the processor 160 to trigger the audio output component 172 to output ultrasonic output signal 186. Additionally, the network service 140 can retrieve data set 198 from the processor 160. Data set 198 can include data related to the times the audio output component 172 outputs ultrasonic output signal 186.

The computing device 10 can detect a first ultrasonic signal (604) and can detect another ultrasonic signal (606). For example, the processor 160 can determine each time the UR component 174 detects ultrasonic signals 188. Furthermore, the processor 160 can determine each time the UR component 174 detects ultrasonic signals 188 (608). In some implementations, the network service 140 can determine the detection of ultrasonic signal 188 by the UR component 174 and the times each ultrasonic signal 188 is detected. For example, the processor 160 can transmit data set 192 including data related to the detection and times of detection of each ultrasonic signal 188.

In some implementations, the subsequently detected ultrasonic signals could be echoes of the emitted ultrasonic signal. In such implementations, the processor 160 can infer the detected ultrasonic signals are echoes of the emitted ultrasonic signal by the features of both the transmitted ultrasonic signal and the detected ultrasonic signal (e.g., both transmitted and detected ultrasonic signals have the same frequency). In a variation, the network service 140 can make the same determinations by retrieving and receiving data set 192 from the processor 160. Data set 192 can include data relating to the features of the transmitted ultrasonic signal and features of the detected ultrasonic signal.

The computing device 10 can determine whether the ultrasonic signals came from two different bodies based on the times of detection and the detected ultrasonic signals themselves (610). For example, the processor 160 can infer the detected ultrasonic signals 188 came from two different bodies, based on the detection times and times ultrasonic output signal 188 was outputted. Additionally, the processor 160 can confirm the detected ultrasonic signals 18 came from two different bodies based on the transmittal and reception features of the outputted ultrasonic signal and detected ultrasonic signal, respectively (e.g., the outputted ultrasonic signal and detected ultrasonic signals have similar frequencies). Furthermore, in one example, based on the different timings (output of ultrasonic output signal 186 and detection of ultrasonic output signals 188), the processor 160 can infer that each ultrasonic signal 188 echoed off of different bodies at different distances. In some implementations, the network service 140 receives, from the processor 160, data set 192. Data set 192 includes detection times of ultrasonic signals 188 and times ultrasonic signals 186 were outputted. Based on the received data set 192, the network service 140 can infer whether each ultrasonic signal 138 echoed off of different bodies at different distances.

In some implementations, such as illustrated in FIG. 1A, the receiver controller 130 can receive data related to an emitted/outputted ultrasonic signal from the transmission controller 110 (e.g., times when the ultrasonic signal was outputted and the frequency ranges of each ultrasonic signal) over network 108. As such, the receiving subsystem 120 can determine or estimate whether detected ultrasonic signals 145 echoed off of different bodies. In another implementation, one or more devices include the transmission subsystem 105 while a separate device includes the receiving subsystem 120. As such, each device that includes the transmission subsystem 105 can output a unique ultrasonic signal 145. In response, a device of the receiving subsystem 120 can determine that each unique ultrasonic signal 145 originated from a different device/body.

Still further, in some examples, one or more devices can each include the transmission subsystem 105 and each transmission subsystem 105 can output a unique ultrasonic signal 145. The network service 140 can receive, from the receiver controller 130, data related to each detected unique ultrasonic signal 145 (e.g., time of detection and frequency ranges of each detected unique ultrasonic signal 145). In response, the network service 140 can determine that each unique ultrasonic signal 145 originated from a different device/body.

Ultrasonic chirps or signals can also be used to estimate total number of bodies in a space in some examples. FIG. 7 illustrates an example method for utilizing ultrasonic frequencies to estimate rough volumetric outlines of a space. As illustrated in FIG. 7, a computing device 10 can emit or output an ultrasonic output signal (700). For example, a transmission subsystem 105 and a receiving subsystem 120 can be implemented on the same computing device 10 (e.g., such as illustrated in FIG. 1B). For example, as illustrated in FIG. 1B, the processor 160 instructs the audio output component 172 to output an ultrasonic output signal 186. In some implementations, the network service 140 can instruct the processor 160 to trigger the audio output component 172 to output an ultrasonic output signal 186.

The computing device 10 can determine that an ultrasonic signal has been detected by a receiving subsystem (702). For example, the UR component 174 detects ultrasonic signal 188. The processor 160 can determine that the UR component 124 detected ultrasonic signals 188. In some implementations, the processor 160 can transmit, to the network service 140, data set 192, where data set 192 includes data relating to the detection of ultrasonic signal 188.

The computing device 10 can instruct the audio output component 172 to output another ultrasonic output signal (704). The computing device 10 can detect another ultrasonic output signal (706). For example, the processor 160 and/or the network service 140 can trigger the emission of ultrasonic outputs signal 186 and can determine the detection of ultrasonic output signal 188.

The computing device 10 can determine the times of when each ultrasonic output signal was outputted and the times of when each ultrasonic signal was detected (708). For example, the processor 160 logs and associates a timestamp for each time each ultrasonic output signal 186 is outputted and a timestamp for each time each ultrasonic signal 188 is detected. In some implementations, the network service 140 receives, from the processor 160, data set 192, including the timestamps of the emission of ultrasonic output signal 186 and the timestamps of the detection of ultrasonic signal 188 was detected.

The computing device 10 compares the detection times and emission times of the ultrasonic signals (710). For example, the processor 160 can compare the time when each ultrasonic signal 188 is detected with the time when each ultrasonic signal 186 is outputted. Based on the comparison, the processor 160 can determine whether the computing device 10 is indoors or outdoors. For instance, if the differences between the timestamps of each ultrasonic output signal 186 and each ultrasonic signal 188 is small, there is a likelihood that the device is indoors. On the other hand, if the differences between the timestamps of each ultrasonic output signal 186 and each ultrasonic signal 188 are big, there is a likelihood that the device is outdoors. In some implementations, the network service 140 can make the comparison and determination. For instance, the network service 140 can receive data relating to the timestamps of ultrasonic signal 188 detection and the time stamps of ultrasonic output signal 186. Additionally, the network service 140 can compare the timestamps and determine whether computing device 10 is indoors or outdoors.

Still further, in other examples, ultrasonic chirps or signals can be used to estimate TDOA (time distance of arrival). FIG. 8 illustrates an example method for utilizing ultrasonic signals to estimate TDOA. The computing device 10 can detect an ultrasonic signal (800) and can determine when the ultrasonic signal was detected and how far away the ultrasonic signal originated from (802). For example, the receiver controller 130 determines that the ultrasonic receiver 125 detected the ultrasonic signal 145. The receiver controller 130 can determine when the ultrasonic receiver 125 detected the ultrasonic signal 145 and how far away ultrasonic signal 145 originated from. In some implementations, the receiving subsystem 120 and the transmission subsystem 105 are on separate devices. In such an implementation, the receiver controller 130 can determine the distance of the device of the transmission subsystem 105 relative to the device of the receiving subsystem 120.

The computing device 10 can detect another ultrasonic signal (804) and determines when that ultrasonic signal was detected and how far away that ultrasonic signal originated from (806). For example, the receiver controller 130 determines that the ultrasonic receiver 125 detected another ultrasonic signal 145. The receiver controller 130 can determine when the ultrasonic receiver 125 detected the next ultrasonic signal 145 and the how far away the next ultrasonic signal 145 originated from.

Based on the determined times and distances of steps, the computing device 10 can estimate a TDOA of another device (808). Once the TDOA is determined, the computing device 10 can be provided to a display to present (810). For example, in some implementations, the transmission subsystem 105 and the receiving subsystem 120 are on separate devices. In such implementations, based on the determined times and distances, the receiver controller 130 determines the TDOA (e.g., using Doppler calculations) of the device of the transmission subsystem 105. In one example, the receiving subsystem 120 can provide data corresponding to the TDOA to the computing device 10 for display.

In the context of a network computing system, in some implementations, as illustrated in FIG. 2 for example, the requester device 270 includes the receiving subsystem 120 and the service provider device 280 can include the transmission subsystem 105. In such an implementation, the receiving subsystem 120 can provide a TDOA of service provider device 280 to the requesting user 274 on the requester device 270. For example, the service provider device 280 can transmit to the requester device 270 pulses of ultrasonic signal 292 to the requester device 270. The receiving subsystem 120 can determine a detection time of each ultrasonic signal 292 and a distance between the service provider device 280 and the requester device 270 at the time each ultrasonic signal 292 was outputted. Based on the determined times and distances, the receiving subsystem 120 can determine a TDOA (e.g., using Doppler calculations) of the service provider device 280. Furthermore, the receiving the subsystem 120 can provide the TDOA to requesting user 274 on the requester device 270.

In some implementations, as illustrated in FIGS. 1A and 2, the network service 140 or the network computing system 200 can determine a TDOA and provide the TDOA data to a display. For example, as illustrated in FIG. 1A, the network service 140 can receive (over network 108), data set 148 relating to the detected times of each ultrasonic signal 145 and how far the ultrasonic signal 145 originated from (e.g., distance between a device of the transmission subsystem 105 and a device of the receiving subsystem 120 when the ultrasonic signal 145 was outputted). Therefore, based on the data received, the network service 140 can determine a TDOA and provide it to a display of the computing device 10. In other examples, as illustrated in FIG. 2, the network computing system 200 can receive, from service provider device 280, the times of when ultrasonic signal 292 was emitted or outputted to requester device 270. The network computing system 200 can determine the distance between service provider device 280 and requester device 270 each time each ultrasonic signal 292 was outputted. As such, based on the determined times and distances, network computing system 200 can determine a TDOA (e.g., using Doppler calculations) of service provider device 280 and provide the TDOA to requester device 270.

Hardware Diagram

Figure 9:
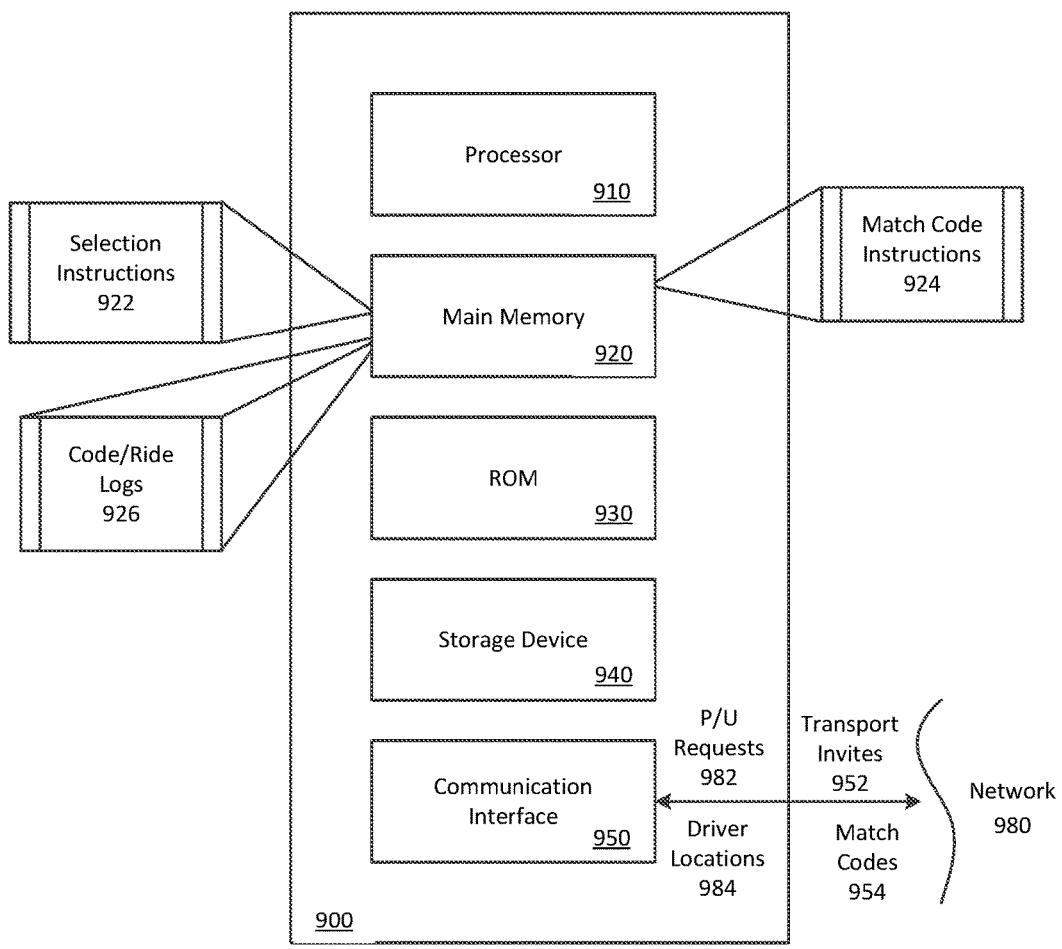
FIG. 9 illustrates a computer system upon which examples described herein may be implemented.

FIG. 9 is a block diagram that illustrates a computer system upon which examples described herein may be implemented. A computer system 900 can be implemented on, for example, a server or combination of servers. For example, the computer system 900 may be implemented as part of a network service for providing transportation services. In the context of FIG. 1, the network service 140 may be implemented using a computer system 900 such as described by FIG. 9. The network computing system 200 may also be implemented using a combination of multiple computer systems as described in connection with FIG. 9.

In one implementation, the computer system 900 includes processing resources 910, a main memory 920, a read-only memory (ROM) 930, a storage device 940, and a communication interface 950. The computer system 900 includes at least one processing resource 910 for processing information stored in the main memory 920, such as provided by a random access memory (RAM) or other dynamic storage device, for storing information and instructions which are executable by the processor 910. The main memory 920 also may be used for storing temporary variables or other intermediate information during execution of instructions to be executed by the processor 910. The computer system 900 may also include the ROM 930 or other static storage device for storing static information and instructions for the processor 910. A storage device 940, such as a magnetic disk or optical disk, is provided for storing information and instructions.

The communication interface 950 enables the computer system 900 to communicate with one or more networks 980 (e.g., cellular network) through use of the network link (wireless or wired). Using the network link, the computer system 900 can communicate with one or more computing devices, one or more servers, and/or one or more self-driving vehicles. In accordance with examples, the computer system 900 receives pick-up requests 982 from mobile computing devices of individual users. The executable instructions stored in main memory 920 can include selection instructions 922, which the processor 910 executes to select a service provider to service the pick-up request 982 in a normal mode. In doing so, the computer system can receive driver locations 984 of drivers operating throughout the given region, and the processor can execute the selection instructions 922 to select a driver from a set of available drivers, and transmit a transport invitation 952 to enable the driver to accept or decline the ride service offer.

By way of example, the instructions and data stored in the main memory 920 can be executed by the processor 910 to implement an example network service 140 of FIG. 1. In performing the operations, the processor 910 can receive pick-up requests 982 and provider locations 984, and submit transport invitations 952 and match codes 954 to facilitate the servicing of the requests 982. The processor 910 is configured with software and/or other logic to perform one or more processes, steps and other functions described with implementations, such as described by FIGS. 1 through 8, and elsewhere in the present application.

Examples described herein are related to the use of the computer system 900 for implementing the techniques described herein. According to one example, those techniques are performed by the computer system 900 in response to the processor 910 executing one or more sequences of one or more instructions contained in the main memory 920. Such instructions may be read into the main memory 920 from another machine-readable medium, such as the storage device 940. Execution of the sequences of instructions contained in the main memory 920 causes the processor 910 to perform the process steps described herein. In alternative implementations, hard-wired circuitry may be used in place of or in combination with software instructions to implement examples described herein. Thus, the examples described are not limited to any specific combination of hardware circuitry and software.

It is contemplated for examples described herein to extend to individual elements and concepts described herein, independently of other concepts, ideas or systems, as well as for examples to include combinations of elements recited anywhere in this application. Although examples are described in detail herein with reference to the accompanying drawings, it is to be understood that the concepts are not limited to those precise examples. As such, many modifications and variations will be apparent to practitioners skilled in this art. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mentioned of the particular feature. Thus, the absence of describing combinations should not preclude claiming rights to such combinations.

What is claimed is:

1. A method for operating computing devices to provide transport for requesters of a network service, the method comprising:
    in response to an event corresponding to a requester device being within a proximity distance threshold to a service provider device, triggering the service provider device to initiate a listening mode in which the service provider device operates to detect ultrasonic signals;
    detecting, by an ultrasonic receptive component of the service provider device, a first ultrasonic signal outputted by the requester device;
    determining, by the service provider device, a service provider operating the service provider device is matched to a requester operating the requester device, based on information determined from the first ultrasonic signal and information received from the network service; and
    in response to determining that the service provider is matched to the requester, authorizing a transport that is to be provided by the service provider to be associated with an account of the requester device.

2. The method of claim 1, wherein the requester device includes an audio output component to output the first ultrasonic signal.

3. The method of claim 1, wherein the ultrasonic receptive component is a gyroscope.

4. The method of claim 1, wherein the ultrasonic receptive component is an electro-acoustic transducer.

5. The method of claim 1, wherein the ultrasonic receptive component is an accelerometer.

6. The method of claim 1, further comprising:
    determining one or more features of the first ultrasonic signal.

7. The method of claim 6, wherein determining that the service provider is matched to the requester includes:
    obtaining an ultrasonic signature associated with a service request associated with the requester; and
    based on the determined one or more features of the first ultrasonic signal, determining whether the one or more features of the first ultrasonic signal match the ultrasonic signature of the service request associated with the requester.

8. The method of claim 1, wherein the requester device outputs the first ultrasonic signal in response to the requester device entering in a specified area.

9. The method of claim 1, wherein the requester device outputs the first ultrasonic signal in response to the requester device being within the proximity distance threshold to the service provider device.

10. The method of claim 1, further comprising:
    prior to detecting the first ultrasonic signal:
        detecting, by the ultrasonic receptive component of the service provider device, a previous ultrasonic signal;
        determining that the previous ultrasonic signal is transmitted for a first duration of time and within a first frequency range that extends from a first frequency to a second frequency; and
        based on the first frequency range and the first duration of time, determining that the previous ultrasonic signal is a preamble of a binary code.

11. The method of claim 10, further comprising:
obtaining a match code specific to a service request associated with the requester; and
wherein determining the service provider is matched to the requester includes:
  determining the first ultrasonic signal was transmitted for a second duration of time and within a second frequency range that extends from a first frequency to a second frequency;
  subsequently detecting a set of ultrasonic signals;
  for each ultrasonic signal in the set of ultrasonic signals, determining that each ultrasonic signal in the set of ultrasonic signals was transmitted for a duration of time within a frequency range;
  based on (i) the first frequency range, (ii) the first duration of time, (iii) the second frequency range, (iv) the second duration of time, (v) the frequency ranges of each ultrasonic signal in the set of ultrasonic signals, and (vi) the duration of time that each ultrasonic signal was transmitted, determining that the first ultrasonic signal and each ultrasonic signal in the set of ultrasonic signals corresponds to a bit state; and
  based on the bit states that correspond to the first ultrasonic signal and each ultrasonic signal in the set of ultrasonic signals, determining that the bit states that correspond to the first ultrasonic signal and to each ultrasonic signal of the set of ultrasonic signals match the match code.

12. A non-transitory computer-readable storage medium having stored therein instructions which, when executed by one or more processors, cause a service provider device to:
  in response to an event corresponding to a requester device being within a proximity distance threshold to the service provider device, trigger the service provider device to initiate a listening mode in which the service provider device operates to detect ultrasonic signals;
  detect a first ultrasonic signal transmitted by the requester device;
  determine a service provider operating the service provider device is matched to a requester operating the requester device, based on information determined from the first ultrasonic signal and information received from a network computer system; and
  in response to determining that the service provider is matched to the requester, authorize a transport that is to be provided by the service provider to be associated with an account of the requester device.

13. The non-transitory computer-readable storage medium of claim 12, wherein the requester device includes an audio output component to transmit the first ultrasonic signal.

14. The non-transitory computer-readable storage medium of claim 12, wherein the service provider device includes an ultrasonic receptive component to detect the first ultrasonic signal, the ultrasonic receptive component being a gyroscope.

15. The non-transitory computer-readable storage medium of claim 12, wherein the service provider device includes an ultrasonic receptive component to detect the first ultrasonic signal, the ultrasonic receptive component being an electro-acoustic transducer.

16. The non-transitory computer-readable storage medium of claim 12, wherein the service provider device includes an ultrasonic receptive component to detect the first ultrasonic signal, the ultrasonic receptive component being an accelerometer.

17. The non-transitory computer-readable storage medium of claim 12, wherein the instructions when executed by the one or more processors, further cause the service provider device to:
  determine one or more features of the first ultrasonic signal.

18. The non-transitory computer-readable storage medium of claim 17, wherein the instructions that cause the service provider device to determine that the service provider is matched to the requester, further causes the service provider device to:
  obtain an ultrasonic signature associated with a service request associated with the requester; and
  based on the determined one or more features of the first ultrasonic signal, determine whether the one or more features of the first ultrasonic signal match the ultrasonic signature of the service request associated with the requester.

19. The non-transitory computer-readable storage medium of claim 12, wherein the requester device outputs the first ultrasonic signal in response to the requester device entering in a mass egress area.

20. The non-transitory computer-readable storage medium of claim 12, wherein the requester device outputs the first ultrasonic signal in response to the requester device being within the proximity distance threshold to the service provider device.

* * * * *